(12) United States Patent
Nakanishi et al.

(10) Patent No.: US 8,749,524 B2
(45) Date of Patent: Jun. 10, 2014

(54) APPARATUS WITH POSITION DETECTION FUNCTION

(75) Inventors: Daisuke Nakanishi, Matsumoto (JP); Kanechika Kiyose, Matsumoto (JP)

(73) Assignee: Seiko Epson Corporation (JP)

( * ) Notice: Subject to any disclaimer, the term of this patent is extended or adjusted under 35 U.S.C. 154(b) by 463 days.

(21) Appl. No.: 13/083,813

(22) Filed: Apr. 11, 2011

(65) Prior Publication Data

US 2011/0267315 A1  Nov. 3, 2011

(30) Foreign Application Priority Data

Apr. 28, 2010  (JP) .................................. 2010-103106

(51) Int. Cl.
   *G06F 3/042*  (2006.01)

(52) U.S. Cl.
   USPC ........................................ 345/175; 178/18.09

(58) Field of Classification Search
   USPC ............ 345/156, 173–179; 178/18.01–18.09, 178/18.11
   See application file for complete search history.

(56) References Cited

U.S. PATENT DOCUMENTS

| | | | |
|---|---|---|---|
| 6,594,551 B2 * | 7/2003 | McKinney et al. ........... | 700/258 |
| 6,953,926 B2 | 10/2005 | Reime | |
| 8,035,671 B2 * | 10/2011 | Evans ........................... | 347/188 |
| 2001/0052581 A1 * | 12/2001 | Bohn ....................... | 250/559.38 |
| 2005/0133693 A1 * | 6/2005 | Fouquet et al. ........... | 250/214 R |
| 2005/0236481 A1 * | 10/2005 | Gascoyne et al. ............ | 235/454 |
| 2007/0046625 A1 * | 3/2007 | Yee ................................ | 345/156 |
| 2008/0121442 A1 * | 5/2008 | Boer et al. .................. | 178/18.09 |

FOREIGN PATENT DOCUMENTS

| | | |
|---|---|---|
| JP | 2003-534554 | 11/2003 |
| JP | 2010-231505 | 10/2010 |

* cited by examiner

*Primary Examiner* — Stephen Sherman

(74) *Attorney, Agent, or Firm* — Harness, Dickey & Pierce, P.L.C.

(57) ABSTRACT

In an apparatus with a position detection function, a position detecting section detects the position of a target object on the basis of a result obtained by receiving detection light, which is emitted from a light source section for detection and reflected by the target object, using a light detection section. As seen from an emitting direction of the detection light, the light detection section is located inside a region surrounded by a closed circuit passing through a plurality of the light source sections for detection or inside a region pinched by the plurality of light source sections for detection. The plurality of light source sections for detection has a first light-emitting element, and a second light-emitting element located closer to the light detection section side than the first light-emitting element. The light source driving section alternately turns on the first light-emitting element and the second light-emitting element.

7 Claims, 15 Drawing Sheets

APPARATUS WITH POSITION DETECTION FUNCTION

BACKGROUND

1. Technical Field

The present invention relates to an apparatus with a position detection function which optically detects the position of a target object located on the side of a surface from which information is viewed.

2. Related Art

As an optical position detecting device which optically detects a target object, for example, as shown in FIG. 15, an optical position detecting device is suggested in which detection light L2 is emitted toward the target object Ob via a translucent member 90 from two light source sections 12 for detection, and detection light L3 reflected by the target object Ob is transmitted through the translucent member 90 and is detected by a light detection section 30. In this optical position detecting device, for example, if the two light source sections 12 for detection are differentially moved on the basis of a detection result in the light detection section 30, the ratio of the distance between one light source section 12 for detection of the two light source sections 12 for detection and the target object Ob and the distance between the other light source section 12 for detection and the target object Ob is known. Accordingly, the position of the target object Ob can be detected (refer to JP-T-2003-534554 (FIG. 10)).

However, in the configuration shown in FIG. 15, in a case where the target object Ob is inside two light source sections 12 for detection as shown as the target object $Ob_1$ and in a case where the target object Ob is outside the two light source sections 12 for detection as shown as the target object $Ob_2$, there is a problem in that the ratio of the distance between one light source section 12 for detection of the two light source sections 12 for detection and the target object Ob and the distance between the other light source section 12 for detection and the target object Ob becomes equal. For this reason, when the ratio of the distance between one light source section 12 for detection of the two light source sections 12 for detection and the target object Ob and the distance between the other light source section 12 for detection and the target object Ob is obtained, it cannot be distinguished whether the distance between the two light source sections 12 for detection may be internally divided or externally divided.

SUMMARY

An advantage of some aspects of the invention is to provide an apparatus with a position detection function which can detect whether a target object is outside or inside a region where a light source for detection is arranged.

According to an aspect of the invention, there is provided an apparatus with a position detection function that has a viewing surface constituent member including a viewing surface, and an optical position detecting device which detects the position of a target object located on the viewing surface side of the viewing surface constituent member. The optical position detecting device includes a plurality of light source sections for detection which emits detection light toward the viewing surface side and is separated in a direction intersecting an emitting direction of the detection light; a light detection section which receives the detection light reflected by the target object located in a detection light emitting space from which the detection light is emitted on the side of the viewing surface; a light source driving section that sequentially turns on the plurality of light source sections for detection; and a position detecting section which detects the position of the target object on the basis of light-receiving results of the light detection section. As seen from the detection light emitting space, the light detection section is located inside a region surrounded by the plurality of light source sections for detection or inside a region pinched by the plurality of light source sections for detection. The plurality of light source sections for detection has an outer light-emitting element, and an inner light-emitting element arranged inside where the light detection section is located to the outer light-emitting element. The position detecting section determines whether the target object is located either outside or inside the light source section for detection, on the basis of a comparison result between the light-receiving intensity in the light detection section when the outer light-emitting element is turned on and the light-receiving intensity in the light detection section when the inner light-emitting element is turned on.

In the aspect of the invention, the light source driving section sequentially turns on the plurality of light source sections for detection, and the light detection section receives the detection light reflected by the target object during that time. Accordingly, if a detection result in the light detection section is directly used, or a driving current or the like when the two light source sections for detection are differentially moved via the light detection section is used, the position detecting section can detect the position of the target object. Here, as seen from the emitting space, the light detection section is located inside the plurality of light source sections for detection, the plurality of light source sections for detection includes an outer light-emitting element and an inner light-emitting element inside the outer light-emitting element, respectively. Accordingly, the position detecting section can determine whether the target object is located either outside or inside the light source section for detection on the basis of a comparison result between the light-receiving intensity in the light detection section when the outer light-emitting element is turned on and the light-receiving intensity in the light detection section when the inner light-emitting element is turned on. For this reason, when the ratio of the distance between one light source section for detection of the two light source sections for detection and the target object and the distance between the other light source section for detection and the target object is obtained, the distance between the two light source sections for detection may be internally divided to specify the position of the target object. However, there is no doubt as to whether the distance between the two light source sections for detection may be externally divided to specify the position of the target object. Therefore, the position of the target object can be accurately detected.

In the aspect of the invention, it is possible to adopt a configuration in which, when the outer light-emitting element and the inner light-emitting element alternately emit light with the same intensity, the position detecting section determines that the target object is located outside the light source section for detection if the light-receiving intensity in the light detection section when the outer light-emitting element emits light is larger than the light-receiving intensity in the light detection section when the inner light-emitting element emits light, and determines that the target object is located inside the light source section for detection if the light-receiving intensity in the light detection section when the outer light-emitting element emits light is smaller than the light-receiving intensity in the light detection section when the inner light-emitting element emits light.

In the aspect of the invention, a configuration may be adopted in which, when the outer light-emitting element and the inner light-emitting element alternately emit light with the same intensity, the position detecting section determines that the target object is located outside an intermediate position between the outer light-emitting element and the inner light-emitting element if the light-receiving intensity in the light detection section when the outer light-emitting element emits light is larger than the light-receiving intensity in the light detection section when the inner light-emitting element emits light, and determines that the target object is located inside the intermediate position between the outer light-emitting element and the inner light-emitting element if the light-receiving intensity in the light detection section when the outer light-emitting element emits light is smaller than the light-receiving intensity in the light detection section when the inner light-emitting element emits light.

In the aspect of the invention, it is preferable that, when the emitting direction of the detection light is defined as a Z-axis direction, and two directions intersecting the Z-axis direction are defined as an X-axis direction and a Y-axis direction, the plurality of light source sections for detection includes a light source section for detection separated in the X-axis direction, and a light source section for detection separated in the Y-axis direction. According to this configuration, the X coordinate and Y coordinate of the target object can be detected.

In the aspect of the invention, it is preferable that the position detecting section detects the position of the target object in the direction along the viewing surface depending on a result obtained by differentially moving some light source sections for detection and other light source sections for detection in the plurality of light source sections for detection, on the basis of the light-receiving result of the light detection section. If such a differential movement is used, influence of environmental light or the like can be automatically corrected.

In the aspect of the invention, it is preferable that the apparatus with a position detection function further includes a light source for reference that enters the light detection section without going via the detection light emitting space and emits reference light. The position detecting section detects the position of the target object in the direction along the viewing surface depending on a result obtained by changing and differentially moving combinations of some light source sections for detection of the plurality of light source sections for detection and the light source for reference, on the basis of the light-receiving result of the light detection section. If such a differential movement is used, influence of environmental light or the like can be automatically corrected.

In the aspect of the invention, it is preferable that the position detecting section detects the position of the target object in a direction normal to the viewing surface on the basis of a light-receiving result in the light detection section when the plurality of light source sections for detection is simultaneously or sequentially turned on.

In the aspect of the invention, it is preferable that the detection light is infrared light. According to this configuration, since the detection light is not viewed, there is an advantage that the detection light does not hinder viewing of information.

The apparatus with a position detection function to which the invention is applied can be configured as, for example, the following apparatuses.

In the aspect of the invention, the viewing surface constituent member can adopt the configuration of a direct viewing type image generating device which displays an image serving as information. In this case, the viewing surface is an image display surface on which the image is displayed in the direct viewing type image generating device. According to this configuration, the apparatus with a position detection function can be configured as a direct viewing type display apparatus with a position detection function.

In the aspect of the invention, the viewing surface constituent member can adopt the configuration of a screen. In this case, the viewing surface is a screen surface from which the information is viewed in the screen.

Here, it is possible to adopt a configuration in which the light source sections for detection and the light detection section are arranged on the side of the screen opposite to the viewing surface side. According to this configuration, the apparatus with a position detection function can be configured as a screen apparatus with a position detection function.

In the aspect of the invention, it is also possible to adopt a configuration in which an image projection device which projects an image toward the screen is provided on the viewing surface side of the screen, and the light source sections for detection and the light detection section are arranged at the image projection device. According to this configuration, the apparatus with a position detection function can be configured as a projection type display apparatus with a position detection function.

In the aspect of the invention, the viewing surface constituent member can adopt the configuration of a translucent member which covers an exhibit serving as the information. In this case, the viewing surface is the surface of the translucent member from which the exhibit is viewed on the side opposite to the side where the exhibit is arranged. According to this configuration, the apparatus with a position detection function can be configured as a window with a position detection function or the like.

In the aspect of the invention, the viewing surface constituent member can adopt the configuration of a base which supports a game medium which moves. In this case, the viewing surface is the surface of the side from which the relative position between the base and the game medium is viewed as the information. According to this configuration, the apparatus with a position detection function can be configured as an amusement apparatus, such as a pachinko base or a coin game.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 15:
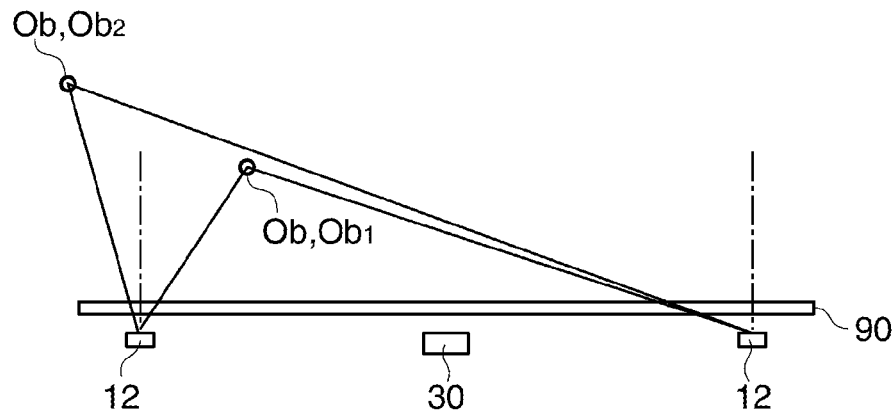
FIG. 15 is an explanatory view of a related-art optical position detecting device.

Next, embodiments of the invention will be described with reference to the accompanying drawings. In addition, in the following description, the axes which intersect each other will be described as the X-axis, the Y-axis, and the Z-axis, and the emitting direction of detection light will be described as the Z-axis direction. Additionally, in the drawings referred to below, one side of an X-axis direction is shown as X1 side, the other side thereof is shown as X2 side, one side of a Y-axis direction is shown as Y1 side, and the other side thereof is shown as Y2 side. Additionally, in the following description, corresponding constituent elements will be designated by the same reference numerals, and will be described so as to make correspondence to constituent elements shown in FIG. 15 easily understood.

Overall Configuration

Figure 1A:
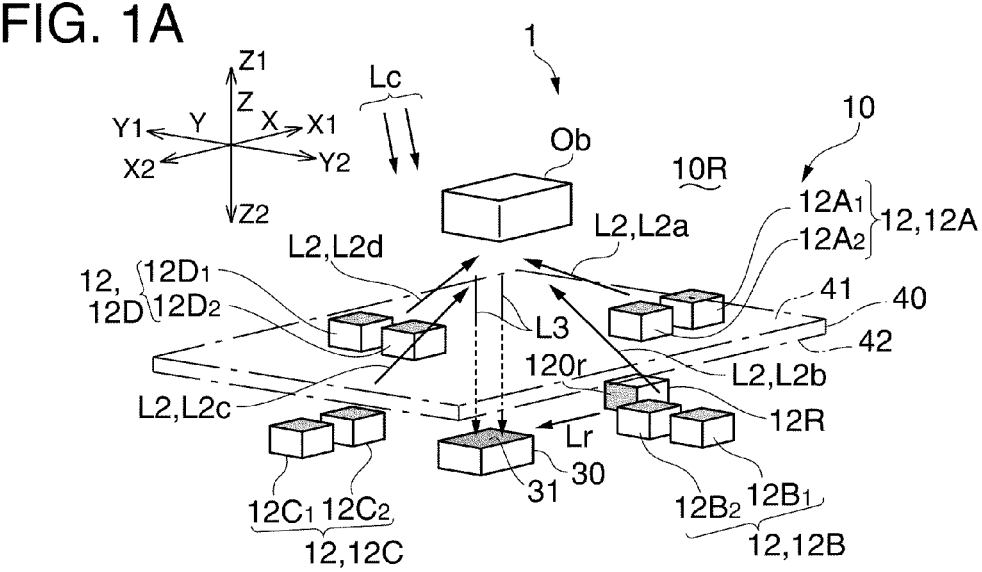
FIGS. 1A to 1C are explanatory views typically showing principal sections of an apparatus with a position detection function to which the invention is applied.
Figure 1B:
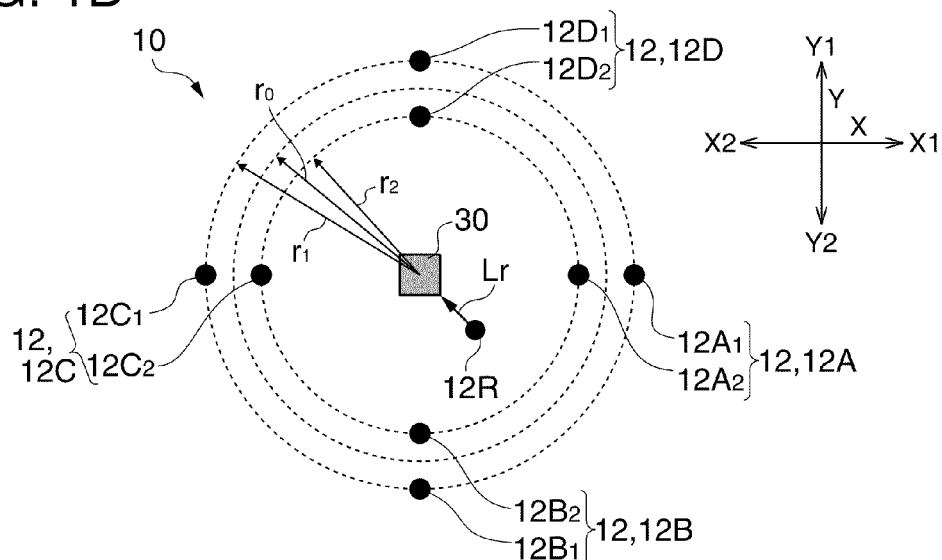
Figure 1C:
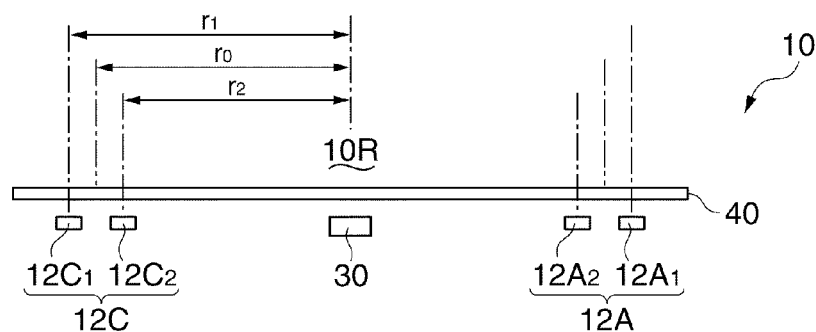
Figure 2:
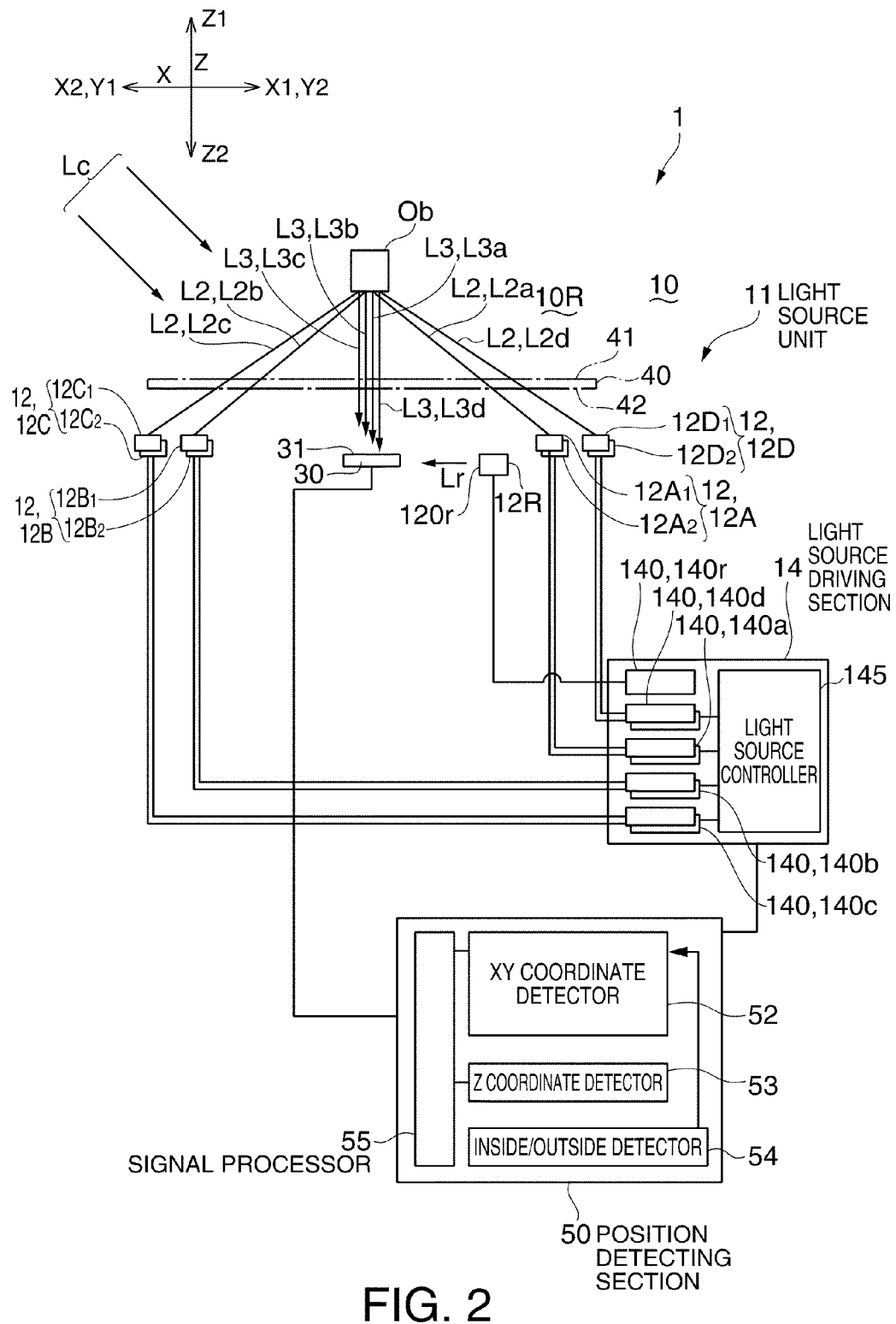
FIG. 2 is an explanatory view showing the overall configuration of an optical position detecting device of the apparatus with a position detection function to which the invention is applied.

FIGS. 1A to 1C are explanatory views typically showing principal sections of the apparatus with a position detection function to which the invention is applied, and FIGS. 1A, 1B and 1C are an explanatory view showing a three-dimensional configuration of constituent elements of an optical position detecting device of an apparatus with a position detection function, an explanatory view showing a planar configuration of the constituent elements of the optical position detecting device of the apparatus with a position detection function, and an explanatory view when the constituent elements of the optical position detecting device are seen from the side. FIG. 2 is an explanatory view showing the overall configuration of the optical position detecting device of the apparatus with a position detection function to which the invention is applied.

In FIGS. 1 and 2, the apparatus 1 with a position detection function of the present embodiment has a viewing surface constituent member 40 including a viewing surface 41 from which information is viewed, and an optical position detecting device 10 which detects the position of a target object Ob located on the viewing surface 41 side (one side Z1 in the Z-axis direction) of the viewing surface constituent member 40, and is used as a display apparatus with a position detection function which will be described below.

The optical position detecting device 10 includes a light source unit 11 including a plurality of light source sections 12 for detection which emits detection light L2 toward the one side Z1 in the Z-axis direction, and a light detection section 30 which detects detection light L3 reflected by the target object Ob. The viewing surface constituent member 40 is a sheet-shaped or plate-shaped translucent member located on the one side Z1 in the Z-axis direction with respect to the light source section 12 for detection and the light detection section 30. Accordingly, the light source section 12 for detection emits the detection light L2 to the viewing surface 41 side from the rear surface 42 side opposite to the viewing surface 41 side in the viewing surface constituent member 40, and the light detection section 30 detects the detection light L3 which has been reflected by the target object Ob and has been transmitted through the rear surface 42 side of the viewing surface constituent member 40. For this reason, a light-receiving portion 31 of the light detection section 30 faces the rear surface 42 of the member.

In the present embodiment, the light source unit 11 includes a first light source section 12A for detection, a second light source section 12B for detection, a third light source section 12C for detection, and a fourth light source section 12D for detection as a plurality of light source sections 12 for detection, and these light source sections 12 for detection all have light-emitting portions which are directed to the viewing surface constituent member 40. Accordingly, the detection light L2 emitted from the light source section 12 for detection is transmitted through the viewing surface constituent member 40 and is emitted to the viewing surface 41 side (emitting space of the detection light L2 from the light source unit 11). In the present embodiment, a detection space 10R where the position of the target object Ob is detected is constituted by this emitting space (space on the side of the viewing surface 41).

The first light source section 12A for detection, the second light source section 12B for detection, the third light source section 12C for detection, and the fourth light source section 12D for detection are arranged in this order around the central optical axis of the light detection section 30 as seen from the detection space 10R (Z-axis direction), and the light detection section 30 is located inside the region surrounded by a plurality of light source sections 12 for detection as seen from the detection space 10R (Z-axis direction). In the plurality of light source sections 12 for detection, the first light source section 12A for detection and the third light source section 12C for detection are separated from each other in the X-axis direction, and the second light source section 12B for detection, and the fourth light source section 12D for detection are separated from each other in the Y-axis direction. In addition, the second light source section 12B for detection and the fourth light source section 12D for detection are also separated from each other in the X-axis direction with respect to the first light source section 12A for detection as seen from the first light source section 12A for detection, and the second light source section 12B for detection and the fourth light source section 12D for detection are also separated from each other in the X-axis direction with respect to the third light source section 12C for detection as seen from the third light source section 12C for detection. Similarly, the first light source section 12A for detection and the third light source section 12C for detection are also separated from each other in the Y-axis direction with respect to the second light source section 12B for detection as seen from the second light source section 12B for detection, and the first light source section 12A for detection and the third light source section 12C for detection are also separated from each other in the Y-axis direction with respect to the fourth light source section 12D for detection as seen from the fourth light source section 12D for detection.

Additionally, as seen from the detection space 10R (Z-axis direction), the first light source section 12A for detection, the second light source section 12B for detection, the third light source section 12C for detection, and the fourth light source section 12D for detection are arranged at equal angular intervals about the light detection section 30. Additionally, as seen from the detection space 10R (Z-axis direction), the first light source section 12A for detection, the second light source section 12B for detection, the third light source section 12C for detection, and the fourth light source section 12D for detection have the same distance from the light detection section 30.

Additionally, the light detection section 30 also includes a light source 12R for reference in which a light-emitting portion 120r is directed to the light source unit 11. The light source 12R for reference is constituted by an LED (light emission diode) or the like, and the light source 12R for reference emits reference light Lr consisting of infrared light whose peak wavelength is located within a range of 840 to 1000 nm as divergence light. Here, the reference light Lr emitted from the light source 12R for reference does not enter the viewing surface 41 side (detection space 10R) of the viewing surface constituent member 40, but enters the light detection section 30, without going via the detection space 10R, by the orientation of the light source 12R for reference, a light-shielding cover (not shown) provided in the light source 12R for reference, or the like.

The light detection section 30 consists of a photodiode, a photo transistor, or the like in which the light-receiving portion 31 is directed to the viewing surface constituent member 40. In the present embodiment, the light detection section 30 is a photodiode including a sensitivity peak of an infrared region.

Detailed Configuration of Light Source Section 12 for Detection

In the optical position detecting device 10 of the present embodiment, each of a plurality of light source sections 12 for detection includes two light-emitting elements lined up in the radial direction, as seen from the detection space 10R (Z-axis direction). More specifically, first, the first light source section 12A for detection includes an outer light-emitting element $12A_1$, and an inner light-emitting element $12A_2$ closer to the light detection section 30 side (inner side) than the outer light-emitting element $12A_1$, and the outer light-emitting element $12A_1$, the inner light-emitting element $12A_2$, and the light detection section 30 are arranged on the same straight line. Additionally, the second light source section 12B for detection, similarly to the first light source section 12A for detection, also includes an outer light-emitting element $12B_1$, and an inner light-emitting element $12B_2$ closer to the light detection section 30 side (inner side) than the outer light-emitting element $12B_1$, and the outer light-emitting element $12B_1$, inner light-emitting element $12B_2$, and the light detection section 30 are arranged on the same straight line. Additionally, the third light source section 12C for detection, similarly to the first light source section 12A for detection, also includes an outer light-emitting element $12C_1$, and an inner light-emitting element $12C_2$ closer to the light detection section 30 side (inner side) than the outer light-emitting element $12C_1$, and the outer light-emitting element $12C_1$, the inner light-emitting element $12C_2$, and the light detection section 30 are arranged on the same straight line. Additionally, the fourth light source section 12D for detection, similarly to the first light source section 12A for detection also includes an outer light-emitting element $12D_1$, and an inner light-emitting element $12D_2$ closer to the light detection section 30 side (inner side) than the outer light-emitting element $12D_1$, and the outer light-emitting element $12D_1$, the inner light-emitting element $12D_2$, and the light detection section 30 are arranged on the same straight line.

Here, the outer light-emitting elements $12A_1$ to $12D_1$ are all located on the circumference of a radius $r_1$ with the light detection section 30 as a center, and the inner light-emitting elements $12A_2$ to $12D_2$ are all located on the circumference of a radius $r_2$ (here, $r_1 > r_2$) with the light detection section 30 as a center. In addition, a circle with the radius $r_0$ (here, $r_0 = (r_1 + r_2)/2$) located at the center between a circle with the radius $r_1$ and a circle with the radius $r_2$ is also expressed in FIG. 1B.

Here, the outer light-emitting elements $12A_1$ to $12D_1$ and the inner light-emitting elements $12A_2$ to $12D_2$ are respectively constituted by light-emitting elements, such as LEDs (light emission diodes), and emit the detection light L2 (detection light L2a to L2d) consisting of infrared light whose peak wavelength is located within a range of 840 to 1000 nm as divergence light.

Configuration of Position Detecting Section or the Like

As shown in FIG. 2, the light source unit 11 includes a light source driving section 14 which drives the plurality of light source sections 12 for detection. The light source driving section 14 includes a light source driving circuit 140 which drives the light source section 12 for detection and the light source 12R for reference, and a light source controller 145 which controls on/off pattern of each of the plurality of light source 12R for reference and the light source section 12 for detection via the light source driving circuit 140. The light source driving circuit 140 includes light source driving circuits 140a to 140d which drive the first light source section 12A for detection to the fourth light source section 12D for detection, and a light source driving circuit 140r which drives the light source 12R for reference. Additionally, the light source driving circuits 140a to 140d individually drive the outer light-emitting elements $12A_1$ to $12D_1$ and the inner light-emitting elements $12A_2$ to $12D_2$, respectively. The light source controller 145 controls all the light source driving circuits 140a to 140d, and 140r. In addition, as for the light source driving circuits 140a to 140d, it is also possible to adopt a configuration in which the outer light-emitting elements $12A_1$ to $12D_1$ and the inner light-emitting elements $12A_2$ to $12D_2$ are individually driven by switching circuits. In this case, only one light source driving circuit 140 is required.

The position detecting section 50 is electrically connected to the light detection section 30, and a detection result in the light detection section 30 is output to the position detecting section 50. The position detecting section 50 includes a signal processor 55 for detecting the position of the target object Ob on the basis of the detection result in the light detection section 30, and this signal processor includes an amplifier, a comparator, or the like. Additionally, the position detecting section 50 includes XY coordinate detector 52 which detects the XY coordinates (position in a direction along the viewing surface 41) of the target object Ob, and the Z coordinate detector 53 which detects the Z coordinate (position in the normal direction of the viewing surface 41) of the target object Ob. Additionally, when the position detecting section 50 detects the X coordinate and Y coordinate of the target object Ob, the position detecting section 50 also includes an inside/outside detector 54 which detects whether the target object Ob is located inside or located outside the light source section 12 for detection. The position detecting section 50 and the light source driving section 14 which are configured in this way operate to interlock with each other, and perform the position detection which will be described below.

Principle of Inside/Outside Detection

FIGS. 3A to 3E are explanatory views showing the principle of inside/outside determination of the target object Ob which is performed by the optical position detecting device 10 of the apparatus 1 with a position detection function to which the invention is applied.

In the optical position detecting device 10 of the present embodiment, as will be described below with reference to FIGS. 4A to 5B, the ratio of the distance between one light source section 12 for detection of the two light source sections 12 for detection and the target object Ob and the distance between another light source section 12 for detection and the target object Ob is obtained by the differential movement between the light source sections 12 for detection or the differential movement between the light source section 12 for detection and the light source 12R for reference, and the position of the target object Ob is detected on the basis of this ratio. Although any of the outer light-emitting elements $12A_1$ to $12D_1$ and the inner light-emitting elements $12A_2$ to $12D_2$ may be used during this differential movement, a case where the outer light-emitting elements $12A_1$ to $12D_1$ are used is illustrated in the following description.

Figure 3A:
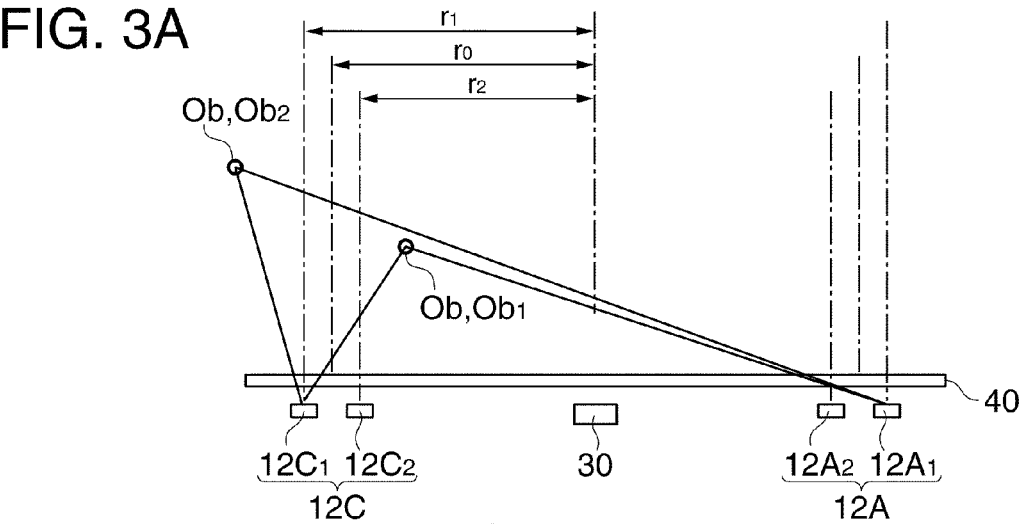
FIGS. 3A to 3E are explanatory views showing the principle of inside/outside determination of a target object which is performed by the optical position detecting device of the apparatus with a position detection function to which the invention is applied.

Additionally, in the present embodiment, before or after the ratio of the distance between one light source section 12 for detection of the two light source sections 12 for detection and the target object Ob and the distance between the other light source section 12 for detection, and the target object Ob is obtained by the differential movement, it is detected whether the target object Ob is located inside the two light source sections 12 for detection as shown as a target object $Ob_1$ in FIG. 3A or whether the target object Ob is located outside the two light source sections 12 for detection as shown as a target object $Ob_2$ in FIG. 3A.

Hereinafter, such an inside/outside detection method will be described taking as an example the case where it is detected whether the target object Ob is inside or outside the third light source section 12C for detection when the coordinates of the target object Ob are detected. In the present embodiment, first, the ratio of the distance between the outer light-emitting element $12A_1$ and the target object Ob and the distance between the outer light-emitting element $12C_1$ and the target object Ob is obtained by the differential movement between the outer light-emitting elements $12A_1$ and $12C_1$ or the differential movement between the outer light-emitting element $12A_1$ or $12C_1$ and the light source 12R for reference.

Additionally, before or after this ratio is obtained, the outer light-emitting element $12C_1$ and the inner light-emitting element $12C_2$ used for the third light source section 12C for detection are alternately turned on, and the detection light L2 is made to emit with the same intensity. Then, in the inside/outside detector 54, the light-receiving intensity in the light detection section 30 when the outer light-emitting element $12C_1$ is turned on and the light-receiving intensity in the light detection section 30 when the inner light-emitting element $12C_2$ is turned on is compared with each other. On the basis of this comparison result, it is detected whether the target object Ob is located either outside or inside the third light source section 12C for detection.

Figure 3B:
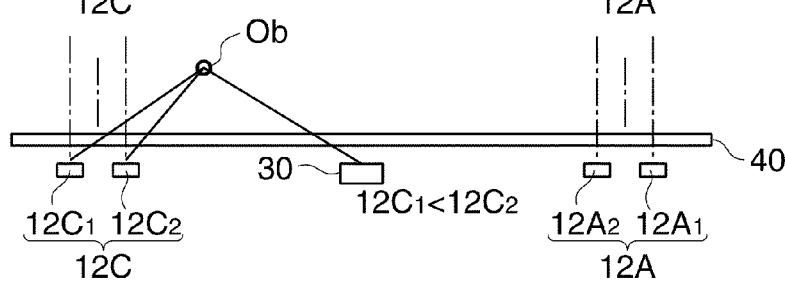

More specifically, as shown in FIG. 3B, in a case where the target object Ob is inside the third light source section 12C for detection, the distance between the target object Ob and the outer light-emitting element $12C_1$ is longer than the distance between the target object Ob and the inner light-emitting element $12C_2$. Accordingly, the detection intensity in the light detection section 30 when the outer light-emitting element $12C_1$ is turned on is smaller than the light-receiving intensity in the light detection section 30 when the inner light-emitting element $12C_2$ is turned on. Accordingly, the inside/outside detector 54 can determine that the target object Ob is inside the third light source section 12C for detection. Therefore, when the XY coordinate detector 52 specifies the coordinates of the target object Ob on the basis of the ratio of the distance between the outer light-emitting element $12A_1$ and the target object Ob and the distance between the outer light-emitting element $12C_1$ and the target object Ob, the distance between the first light source section 12A for detection and the third light source section 12C for detection is internally divided.

Figure 3C:
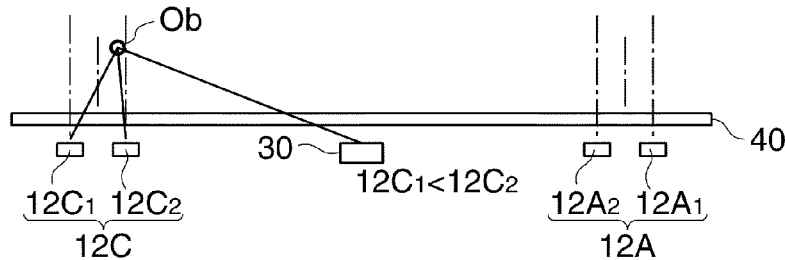
Figure 3D:
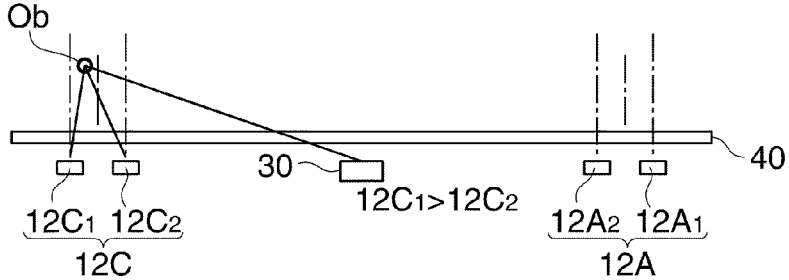
Figure 3E:
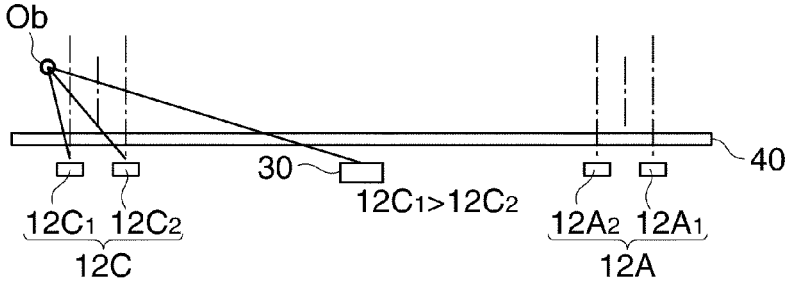

On the other hand, as shown in FIG. 3E, in a case where the target object Ob is outside the third light source section 12C for detection, the distance between the target object Ob and the outer light-emitting element $12C_1$ is shorter than the distance between the target object Ob and the inner light-emitting element $12C_2$. Accordingly, the detection intensity in the light detection section 30 when the outer light-emitting element $12C_1$ is turned on is larger than the light-receiving intensity in the light detection section 30 when the inner light-emitting element $12C_2$ is turned on. Accordingly, the inside/outside detector 54 can determine that the target object Ob is outside the third light source section 12C for detection. Therefore, when the XY coordinate detector 52 specifies the coordinates of the target object Ob on the basis of the ratio of the distance between the outer light-emitting element $12A_1$ and the target object Ob and the distance between the outer light-emitting element $12C_1$ and the target object Ob, the distance between the first light source section 12A for detection and the third light source section 12C for detection is externally divided.

In addition, in a case where the distance between the outer light-emitting element $12C_1$ and the inner light-emitting element $12C_2$ is narrow in the third light source section 12C for detection, as shown in FIGS. 3B and 3C, irrespective of whether the target object Ob is at a position near any of the outer light-emitting element $12C_1$ and the inner light-emitting element $12C_2$, the detection error of the coordinates of the target object Ob is small even if the above method is adopted.

Here, in a case where the distance between the outer light-emitting element $12C_1$ and the inner light-emitting element $12C_2$ is large in the third light source section 12C for detection, the coordinates of the target object Ob may not be performed with a region surrounded by the circle with the radius $r_0$ (here, $r_0=(r_1+r_2)/2$) located at the center between the circle with the radius $r_1$ and the circle with the radius $r_2$ as an effective region and with the outside of the region surrounded by the circle with the radius $r_0$ as an invalid region.

That is, as shown in FIG. 3C, in a case where the target object Ob is located in a region near the inner light-emitting element $12C_2$ between the outer light-emitting element $12C_1$ and the inner light-emitting element $12C_2$, the distance between the target object Ob and the outer light-emitting element $12C_1$ is longer than the distance between the target object Ob and the inner light-emitting element $12C_2$. Accordingly, when the outer light-emitting element $12C_1$ and the inner light-emitting element $12C_2$ used for the third light source section 12C for detection are alternately turned on and the detection light L2 is made to emit with the same intensity, the detection intensity in the light detection section 30 when the outer light-emitting element $12C_1$ is turned on is smaller than the light-receiving intensity in the light detection section 30 when the inner light-emitting element $12C_2$ is turned on. Accordingly, the inside/outside detector 54 can determine that the target object Ob is inside a region surrounded by the circle with the radius $r_0$, i.e., inside the outer light-emitting element $12C_1$. Therefore, when the XY coordinate detector 52 specifies the coordinates of the target object Ob on the basis of the ratio of the distance between the outer light-emitting element $12A_1$ and the target object Ob and the distance between the outer light-emitting element $12C_1$ and the target object Ob, the distance between the first light source section 12A for detection and the third light source section 12C for detection is internally divided.

On the other hand, as shown in FIG. 3D, in a case where the target object Ob is located in a region near the outer light-emitting element $12C_1$ between the outer light-emitting element $12C_1$ and the inner light-emitting element $12C_2$, the distance between the target object Ob and the outer light-emitting element $12C_1$ is shorter than the distance between the target object Ob and the inner light-emitting element $12C_2$. Accordingly, irrespective of whether the target object Ob is inside the outer light-emitting element $12C_1$, the detection intensity in the light detection section 30 when the outer light-emitting element $12C_1$ is turned on is larger than the light-receiving intensity in the light detection section 30 when the inner light-emitting element $12C_2$ is turned on. In such a case, the inside/outside detector 54 stops detection of the coordinates of the target object Ob with the target object Ob outside the region surrounded by the circle with the radius $r_0$. According to this method, in a case where the target object Ob is at least inside the region surrounded by the circle with the radius $r_0$, the coordinates of the target object Ob can be detected with high precision.

In addition, in the present embodiment, the above inside/outside determination is performed in all the first light source sections 12A for detection to the fourth light source sections 12D for detection. For this reason, even in a case where the target object Ob is located in the angular direction which intersects the X-axis direction and the Y-axis direction, it can be determined that the target object Ob is located either inside or outside the first light source section 12A for detection to the fourth light source section 12D for detection. Accordingly, the XY coordinates of the target object Ob can be detected with high precision.

Basic Detection Principle of Coordinates

Figure 4A:
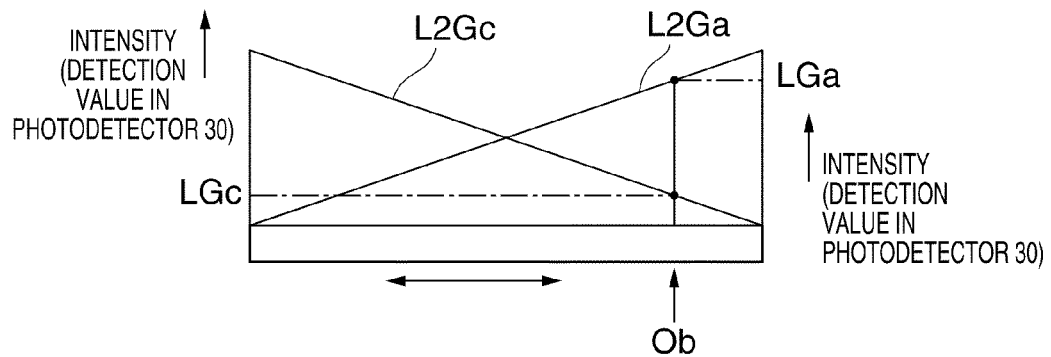
FIGS. 4A and 4B are explanatory views showing a principle that the position of a target object is detected using the differential movement between detection light beams, in the optical position detecting device of the apparatus with a position detection function to which the invention is applied.
Figure 4B:
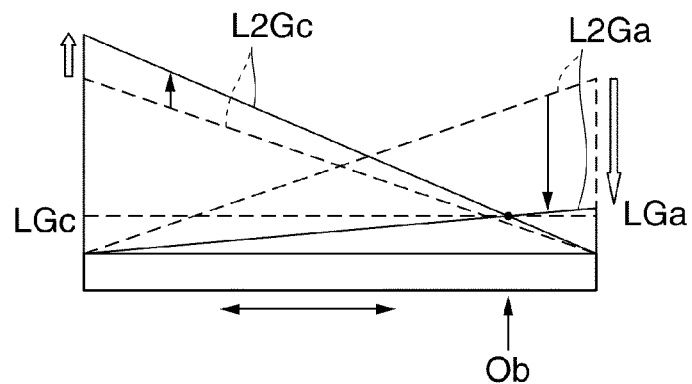

FIGS. 4A and 4B are explanatory views showing the basic principle of coordinate detection used in the optical position detecting device 10 of the apparatus 1 with a position detection function to which the invention is applied. FIGS. 4A and 4B are an explanatory view typically showing the relationship between the position of the target object Ob and the light-receiving intensity in the light detection section 30, and an explanatory view typically showing that the light-emitting intensity of the detection light L2 is adjusted so that the light-receiving intensities in the light detection section 30 become equal to each other.

In the optical position detecting device 10 of the present embodiment, as will be described below with reference to FIGS. 4A and 4B and FIGS. 5A and 5B, the position detecting section 50 obtains the ratio of the distance between one light source section 12 for detection of the two light source sections 12 for detection and the target object Ob and the distance between another light source section 12 for detection and the target object Ob by the differential movement between the light source sections 12 for detection or the differential movement between the light source section 12 for detection and the light source 12R for reference, and detects the position of the target object Ob on the basis of this ratio.

Hereinafter, the basic principle when the X coordinate and Y coordinate of the target object Ob are detected from a plurality of results obtained by changing and differentially moving combinations of two light sources for detection among the first light source section 12A for detection, the second light source section 12B for detection, the third light source section 12C for detection, and the fourth light source section 12D for detection on the basis of the light-receiving result of the light detection section 30 will be described.

In the optical position detecting device 10 of the present embodiment, the detection space 10R is set on a first face 41 side (space on the emitting side of the detection light L2 from the light source unit 11) of the translucent member 40. Additionally, two light source sections 12 for detection, for example, the first light source section 12A for detection and the third light source section 12C for detection, are separated from each other in the X-axis direction and Y-axis direction. For this reason, when the outer light-emitting element $12A_1$ of the first light source section 12A for detection is turned on and the detection light L2a is emitted, the detection light L2a, as shown in FIG. 4A, forms a first light intensity distribution L2Ga in which intensity decreases monotonously toward the other side from one side. Additionally, when the outer light-emitting element $12C_1$ of the third light source section 12C for detection is turned on and detection light L2c is emitted, the detection light L2c passes through the translucent member 40, and forms a second light intensity distribution L2Gc in which intensity increases monotonously on the first face 41 side (detection space 10R) toward the other side from one side.

In order to obtain the positional information on the target object Ob using the differential movement between the detection light L2a and L2c, first, as shown in FIG. 4A, the outer light-emitting element $12A_1$ of the first light source section 12A for detection is turned on, the outer light-emitting element $12C_1$ of the third light source section 12C for detection is turned off, and the first light intensity distribution L2Ga in which intensity decreases monotonously toward the other side from one side is formed. Additionally, the outer light-emitting element $12A_1$ of the first light source section 12A for detection is turned off, the outer light-emitting element $12C_1$ of the third light source section 12C for detection is turned on, and the second light intensity distribution L2Gc in which intensity increases monotonously toward the other side from one side is formed. Accordingly, when the target object Ob is arranged in the detection space 10R, the detection light L2 is reflected by the target object Ob, and a portion of the reflected light is detected by the light detection section 30. In that case, the reflection intensity in the target object Ob is proportional to the intensity of the detection light L2 at a place where the target object Ob is located, and the light-receiving intensity in the light detection section 30 is proportional to the reflection intensity in the target object Ob. Accordingly, the light-receiving intensity in the light detection section 30 has a value corresponding to the position of the target object Ob. Therefore, as shown in FIG. 4B, if the ratio of a driving current when the controlled variable (driving current) for the outer light-emitting element $12A_1$ of the first light source section 12A for detection is adjusted and a driving current when the controlled variable (driving current) for the outer light-emitting element $12C_1$ of the third light source section 12C for detection is adjusted, the ratio of the amounts of adjustment, or the like is used so that a detection value LGa in the light detection section 30 when the first light intensity distribution L2Ga is formed and a detection value LGc in the light detection section 30 when the second light intensity distribution L2Gc is formed become equal, it can be detected whether the target object Ob exists at any position between the outer light-emitting element $12A_1$ of the first light source section 12A for detection and the outer light-emitting element $12C_1$ of the third light source section 12C for detection within the XY plane.

More specifically, as shown in FIG. 4A, the first light intensity distribution L2Ga and the second light intensity distribution L2Gc are formed so that the light intensity distributions become opposite directions to each other. In this state, it can be seen that, if the detection values LGa and LGc in the light detection section 30 are equal to each other, the target object Ob is located at the center between the outer light-emitting element $12A_1$ of the first light source section 12A for detection and the outer light-emitting element $12C_1$ of the third light source section 12C for detection within the XY plane. On the other hand, in a case where the detection values LGa and LGc in the light detection section 30 are different from each other, as shown in FIG. 4B, the first light intensity distribution L2Ga and the second light intensity distribution L2Gc are sequentially formed again by adjusting the controlled variable (driving current) for the outer light-emitting element $12A_1$ of the first light source section 12A for detection and the outer light-emitting element $12C_1$ of the third light source section 12C for detection so that the detection values LGa and LGc become equal to each other. As a result, if the detection values LGa and LGc in the light detection section 30 become equal to each other, and the ratio of a driving current for the outer light-emitting element $12A_1$ of the first light source section 12A for detection and a driving current for the outer light-emitting element $12C_1$ of the third light source section 12C for detection at that time is used, it can be detected whether the target object Ob exists at any position between the outer light-emitting element $12A_1$ of the first light source section 12A for detection and the outer light-emitting element $12C_1$ of the third light source section 12C for detection within the XY plane.

When this detection principle is mathematically described using an optical path function, this is as follows. First, in the above differential movement, when the driving current for the outer light-emitting element $12A_1$ of the first light source section 12A for detection when the light-receiving intensities in the light detection section 30 become equal to each other is defined as $I_A$, the driving current for the outer light-emitting element $12C_1$ of the third light source section 12C for detection is defined as $I_C$, and the ratio of a distance function which leads to the light detection section 30 via the target object Ob from the outer light-emitting element $12A_1$ of the first light source section 12A for detection and a distance function which leads to the light detection section 30 via the target object Ob from the outer light-emitting element $12C_1$ of the third light source section 12C for detection is defined as $P_{AC}$, the ratio $P_{AC}$ is basically obtained according to the following expression:

$$P_{AC}=I_C/I_A$$

Accordingly, it can be seen that the target object Ob position is located on an equal ratio line passing through a position obtained by dividing a line which connects the outer light-emitting element $12A_1$ of the first light source section 12A for detection and the outer light-emitting element $12C_1$ of the third light source section 12C for detection by a predetermined ratio.

This model will be mathematically described. First, respective parameters are defined as follows.

T=Reflectivity of target object Ob $A_t$=Distance function when detection light L2 emitted from outer light-emitting element $12A_1$ of first light source section 12A for detection is reflected by target object Ob and reaches light detection section 30

A=Detection intensity of light detection section 30 when outer light-emitting element $12A_1$ of first light source section 12A for detection is turned on in a state where target object Ob exists in detection space 10R $C_t$=Distance function when detection light L2 emitted from outer light-emitting element $12C_1$ of third light source section 12C for detection is reflected by target object Ob and reaches light detection section 30

C=Detection intensity of light detection section 30 when outer light-emitting element $12C_1$ of third light source section 12C for detection is turned on in a state where target object Ob exists in detection space 10R In addition, although the emission intensity of the outer light-emitting element $12A_1$ of the first light source section 12A for detection and the emission intensity of the outer light-emitting element $12C_1$ of the third light source section 12C for detection are expressed by the product of a driving current and an emission coefficient, the emission coefficient is set to 1 in the following description.

Additionally, when the above-mentioned differential movement is performed in a state where the target object Ob exists in the detection space 10R, the following relationships are obtained.

$$A = T \times A_t \times I_A + \text{Environmental light} \quad (1)$$

$$C = T \times C_t \times I_C + \text{Environmental light} \quad (2)$$

Here, since the detection intensity of the light detection section 30 is equal during differential movement, the following expressions are derived from Expressions (1) and (2).

$$T \times A_t \times I_A + \text{Environmental light} = T \times C_t \times I_C + \text{Environmental light}$$

$$T \times A_t \times I_A = T \times C_t \times I_C \quad (3)$$

Additionally, since the ratio $P_{AC}$ of the distance functions $A_t$ and $C_t$ is defined by the following expression:

$$P_{AC}=A_t/C_t \quad (4),$$

the ratio of the distance function $P_{AC}$ is expressed as shown below from Expressions (3) and (4):

$$P_{AC}=I_C/I_A \quad (5).$$

In this Expression (5), the item of the environmental light and the item of the reflectivity of the target object Ob do not exist. Therefore, the environmental light and the reflectivity of the target object Ob do not influence the ratio $P_{AC}$ of the optical path coefficients $A_t$ and $C_t$. In addition, the correction for offsetting the influence or the like of the detection light L2 which has been incident without being reflected by the target object Ob may be performed on the above mathematical model.

Here, a light source used in the light source section 12 for detection is a point light source, and the optical intensity thereof at a certain point is inversely proportional to the square of a distance from the light source. Accordingly, the ratio of the separation distance P1 between the outer light-emitting element $12A_1$ of the first light source section 12A for detection and the target object Ob and the separation distance P2 between the outer light-emitting element $12C_1$ of the third light source section 12C for detection and the target object Ob is obtained according to the following expression:

$$P_{AC}=(P1)^2:(P2)^2.$$

Therefore, it can be seen that the target object Ob position is located on an equal ratio line passing through a position obtained by dividing an imaginary line which connects the outer light-emitting element $12A_1$ of the first light source section 12A for detection and the outer light-emitting element $12C_1$ of the third light source section 12C for detection in P1:P2.

Similarly, if the outer light-emitting element $12B_1$ and the outer light-emitting element $12D_1$ are differentially moved and the ratio of the distance between the outer light-emitting element $12B_1$ and the target object Ob and the distance between the outer light-emitting element $12D_1$ and the target object Ob is obtained, it can be seen that the target object Ob exists on an equal ratio line passing through a position which divides an imaginary line which connects the outer light-emitting element $12B_1$ and the outer light-emitting element $12D_1$ by a predetermined ratio. Therefore, the X coordinate and Y coordinate of the target object Ob can be detected. In addition, the above method is a method of geometrically describing the principle adopted in the present embodiment. In practice, calculation is performed using the obtained data.

If the inside/outside determination described with reference to FIGS. 3A to 3E is performed in detecting the X coordinate and the Y coordinate in this way, when an imaginary line which connects the outer light-emitting element $12A_1$ and the outer light-emitting element $12C_1$ is divided, and when an imaginary line which connects the outer light-emitting element $12B_1$ and the outer light-emitting element $12D_1$ is divided, proper division can be performed if it is known whether the target object Ob is located inside or outside the first light source section 12A for detection to the fourth light source section 12D for detection. Therefore, the X coordinate and Y coordinate of the target object Ob can be detected with high precision.

Differential Movement Between Reference Light Lr and Detection Light L2

Figure 5A:
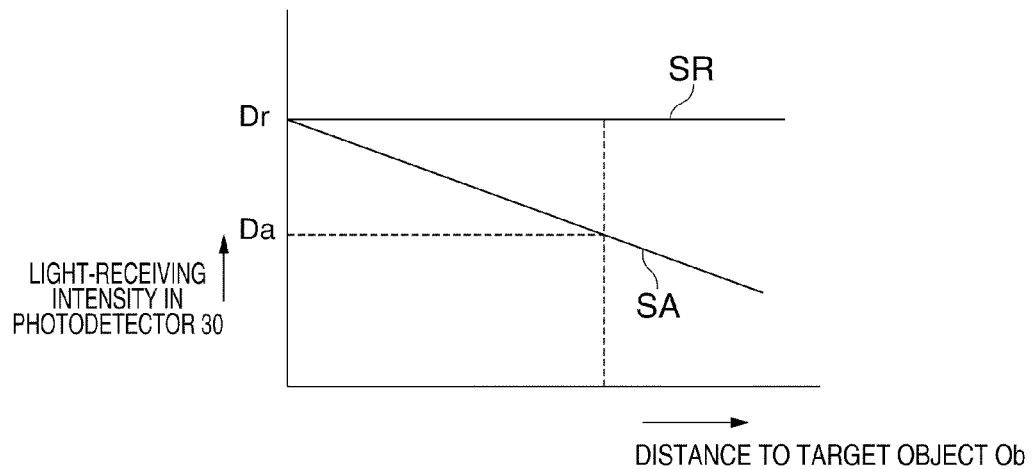
FIGS. 5A and 5B are explanatory views showing a principle that the position of a target object is detected using the differential movement between reference light and detection light, in the optical position detecting device of the apparatus with a position detection function to which the invention is applied.
Figure 5B:
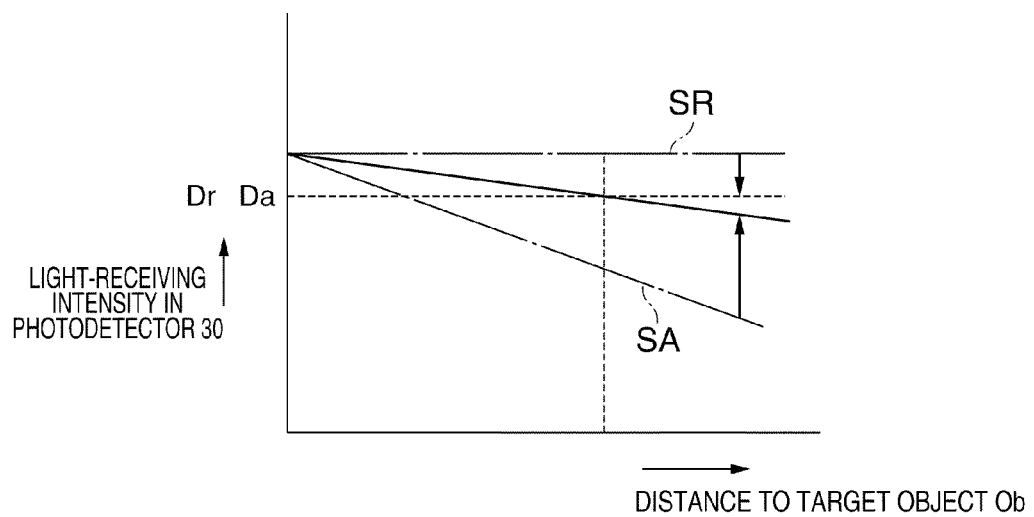

FIGS. 5A and 5B are explanatory views showing a principle that the position of a target object Ob is detected using the differential movement between the reference light Lr and the detection light L2, in the optical position detecting device 10 of the apparatus 1 with a position detection function to which the invention is applied, and FIGS. 5A and 5B are an explanatory view showing the relationship between the distance from the light source section 12 for detection to the target object Ob and the light-receiving intensity of the detection light L2 or the like, and an explanatory view showing an aspect after a driving current to a light source is adjusted.

In the optical position detecting device 10 of the present embodiment, the differential movement between the detection light L2a and the reference light Lr and the differential movement between the detection light L2c and the reference light Lr are used instead of the direct differential movement between the detection light L2a and the detection light L2c, and eventually the same result as the principle described with reference to FIGS. 4A and 4B is derived. Here, the differential movement between the detection light L2a and the reference light Lr and the differential movement between the detection light L2c and the reference light Lr are executed as follows.

As shown in FIG. 5A, in a state where the target object Ob exists in the detection space 10R, the distance to the target object Ob from the outer light-emitting element $12A_1$ of the first light source section 12A for detection, and the light-receiving intensity $D_a$ of the detection light L2a in the light detection section 30 vary monotonously as shown by a solid line SA. On the other hand, the detection intensity in the light detection section 30 of the reference light Lr emitted from the light source 12R for reference is constant irrespective of the position of the target object Ob as shown by a solid line SR. Accordingly, the light-receiving intensity $D_a$ of the detection light L2a in the light detection section 30 and the detection intensity $D_r$ of the reference light Lr in the light detection section 30 are different from each other.

Next, as shown in FIG. 5B, at least one of a driving current for the outer light-emitting element $12A_1$ of the first light source section 12A for detection and a driving current for the light source 12R for reference is adjusted, and the light-receiving intensity $D_a$ of the detection light L2a in the light detection section 30 and the detection intensity $D_r$ in the light detection section 30 of the reference light Lr are made to coincide with each other. Such a differential movement is performed between the reference light Lr and the detection light L2a and is performed between the reference light Lr and the detection light L2c. Accordingly, it is possible to obtain the ratio of a driving current for the outer light-emitting element $12A_1$ of the first light source section 12A for detection and a driving current for the outer light-emitting element $12C_1$ of the third light source section 12C for detection when a detection result of the detection light L2a or L2c (detection light L3a or L3c reflected by the target object Ob) in the light detection section 30 and a detection result of the reference light Lr in the light detection section 30 become equal to each other. Therefore, it can be detected whether the target object Ob exists in any position between the first light source section 12A for detection and the third light source section 12C for detection.

When the above detection principle is mathematically described using an optical path function, this is as follows. First, respective parameters are defined as follows.

T=Reflectivity of target object Ob $A_f$=Distance function when detection light L2 emitted from outer light-emitting element $12A_1$ of first light source section 12A for detection is reflected by target object Ob and reaches light detection section 30

A=Detection intensity of light detection section 30 when outer light-emitting element $12A_1$ of first light source section 12A for detection is turned on in a state where target object Ob exists in detection space 10R $C_f$=Distance function when detection light L2 emitted from outer light-emitting element $12C_1$ of third light source section 12C for detection is reflected by target object Ob and reaches light detection section 30

C=Detection intensity of light detection section 30 when outer light-emitting element $12C_1$ of third light source section 12C for detection is turned on in a state where target object Ob exists in detection space 10R $R_s$=Optical path coefficient from light source 12R for reference to light detection section 30

R=Detection intensity of light detection section 30 when only light source 12R for reference is turned on In addition, although the emission intensity of the outer light-emitting element $12A_1$ of the first light source section 12A for detection, the emission intensity of the outer light-emitting element $12C_1$ of the third light source section 12C for detection, and the emission intensity of the light source 12R for reference are expressed by the product of a driving current and an emission coefficient, the emission coefficient is set to 1 in the following description. Additionally, when the light-receiving intensities in the light detection section 30 become equal to each other in the above differential movement, the driving current for the outer light-emitting element 12A$_1$ of the first light source section 12A for detection is defined as I$_A$, the driving current for the outer light-emitting element 12C$_1$ of the third light source section 12C for detection is defined as I$_C$, and the driving current for the light source 12R for reference is defined as I$_R$. Additionally, it is assumed that the detection intensity of the light detection section 30 when only the light source 12R for reference is turned on during differential movement is the same in the differential movement from the outer light-emitting element 12A$_1$ of the first light source section 12A for detection and in the differential movement from the outer light-emitting element 12C$_1$ of the third light source section 12C for detection.

Additionally, when the above-mentioned differential movement is performed in a state where the target object Ob exists in the detection space 10R, the following relationships are obtained.

$$A = T \times A_t \times I_A + \text{Environmental light} \quad (6)$$

$$C = T \times C_t \times I_C + \text{Environmental light} \quad (7)$$

$$R = R_s \times I_R + \text{Environmental light} \quad (8)$$

Here, since the detection intensity of the light detection section 30 is equal during differential movement, the following expressions are derived from Expressions (6) and (8):

$$T \times A_t \times I_A + \text{Environmental light} = R_s \times I_R + \text{Environmental light}$$

$$T \times A_t \times I_A = R_s \times I_R$$

$$T \times A_t = R_s \times I_R / I_A \quad (9)$$

and, the following expressions are derived from expressions (7) and (8)

$$T \times C_t \times I_C + \text{Environmental light} = R_s \times I_R + \text{Environmental light}$$

$$T \times C_t \times I_C = R_s \times I_R$$

$$T \times C_t = R_s \times I_R / I_C \quad (10).$$

Additionally, since the ratio P$_{AC}$ of the distance functions A$_t$ and C$_t$ is defined by the following expression:

$$P_{AC} = A_t / C_t$$

the ratio of the distance function P$_{AC}$ is expressed as shown below from Expressions (9) and (10):

$$P_{AC} = I_C / I_A \quad (12)$$

In this Expression (12), the item of the environmental light and the item of the reflectivity of the target object Ob do not exist. Therefore, the environmental light and the reflectivity of the target object Ob do not influence the ratio P$_{AC}$ of the optical path coefficients A$_t$ and C$_t$. In addition, the correction for offsetting the influence or the like of the detection light L2 which has been incident without being reflected by the target object Ob may be performed on the above mathematical model. Additionally, even when the detection intensity of the light detection section 30 when only the light source 12R for reference is turned on is set to a different value in the differential movement from the outer light-emitting element 12A$_1$ of the first light source section 12A for detection, and the differential movement from the outer light-emitting element 12C$_1$ of the third light source section 12C for detection, the same principle is basically established.

Here, a light source used in the light source section 12 for detection is a point light source, and the optical intensity thereof at a certain point is inversely proportional to the square of a distance from the light source. Accordingly, the ratio of the separation distance P1 between the outer light-emitting element 12A$_1$ of the first light source section 12A for detection and the target object Ob and the separation distance P2 between the outer light-emitting element 12C$_1$ of the third light source section 12C for detection and the target object Ob is obtained according to the following expression:

$$P_{AC} = (P1)^2 : (P2)^2.$$

Therefore, it can be seen that the target object Ob position is located on an equal ratio line passing through a position obtained by dividing an imaginary line which connects the outer light-emitting element 12A$_1$ of the first light source section 12A for detection and the outer light-emitting element 12C$_1$ of the third light source section 12C for detection in P1:P2.

Similarly, if the ratio of the distance between the outer light-emitting element 12B$_1$ and the target object Ob and the distance between the outer light-emitting element 12D$_1$ and the target object Ob is obtained using the differential movement between the outer light-emitting element 12B$_1$ and the light source 12R for reference and the differential movement between the outer light-emitting element 12D$_1$ and the light source 12R for reference, it can be seen that the target object Ob exists on an equal ratio line passing through a position which divides an imaginary line which connects the outer light-emitting element 12B$_1$ and the outer light-emitting element 12D$_1$ by a predetermined ratio. Therefore, the XY coordinates of the target object Ob can be detected.

If the inside/outside determination described with reference to FIGS. 3A to 3E is performed in detecting the X coordinate and the Y coordinate in this way, when an imaginary line which connects the outer light-emitting element 12A$_1$ and the outer light-emitting element 12C$_1$ is divided, and when an imaginary line which connects the outer light-emitting element 12B$_1$ and the outer light-emitting element 12D$_1$ is divided, proper division can be performed if it is known whether the target object Ob is located inside or outside the first light source section 12A for detection to the fourth light source section 12D for detection. Therefore, the X coordinate and Y coordinate of the target object Ob can be detected with high precision.

Figure 6A:
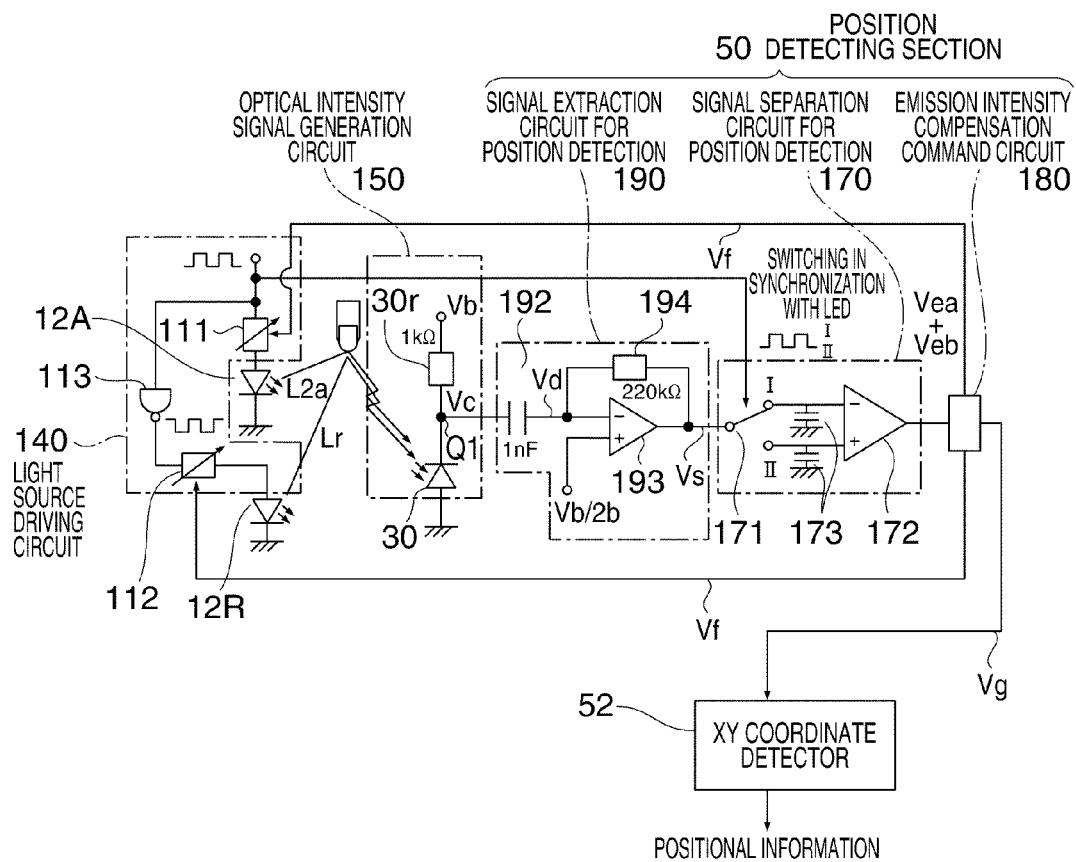
FIGS. 6A and 6B are explanatory views showing the contents of processing performed by a position detecting section, in the optical position detecting device of the apparatus with a position detection function to which the invention is applied.
Figure 6B:
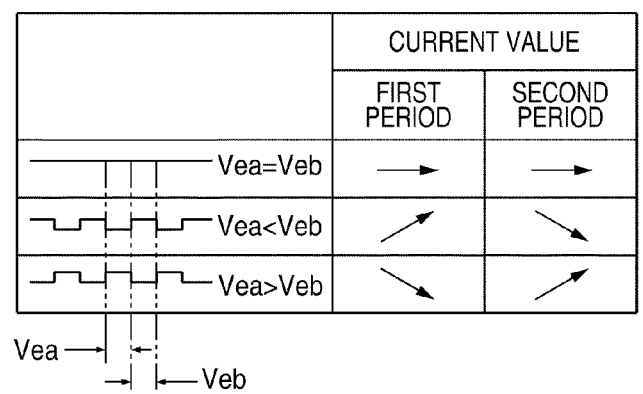

Configuration Example of Position Detecting Section 50 for Differential Movement FIGS. 6A and 6B are explanatory views showing the contents of processing performed by the position detecting section 50, in the optical position detecting device 10 of the apparatus 1 with a position detection function to which the invention is applied.

In carrying out the above differential movement, it is possible to adopt a configuration in which processing is performed by using a microprocessor unit (MPU) as the position detecting section 50, and thereby, executing predetermined software (operation program). Additionally, it is also possible to adopt a configuration in which processing is performed in a signal processor using hardware, such as a logical circuit, as will be described below with reference to FIGS. 6A and 6B. In addition, although the differential movement described with reference to FIGS. 5A and 5B is shown in FIGS. 6A and 6B, if the light source 12R for reference is replaced with the second light source section 12B for detection, the invention can be applied to the differential movement described with reference to FIGS. 4A and 4B.

As shown in FIG. 6A, in the optical position detecting device 10 of the present embodiment, the light source driving circuit 140 applies a driving pulse of a predetermined current value to the first light source section 12A for detection via a variable resistance 111, and applies a driving pulse of a predetermined current value to the light source 12R for reference via a variable resistance 112 and an inverting circuit 113. For this reason, since reversed-phase driving pulses are applied to the first light source section 12A for detection and the light source 12R for reference, the first light source section 12A for detection and the light source 12R for reference are alternately turned on. Also, when the first light source section 12A for detection is turned on, the light reflected by the target object Ob in the detection light L2a is received in the light detection section 30, and when the light source 12R for reference is turned on, the reference light Lr is received in the light detection section 30. In the optical intensity signal generation circuit 150, a resistor 30r of about 1 kΩ is electrically connected in series to the light detection section 30, and a bias voltage Vb is applied to both ends thereof.

In the optical intensity signal generation circuit 150, the position detecting section 50 is electrically connected to a connection point Q1 between the light detection section 30 and the resistor 30r. A detection signal Vc output from the connection point Q1 between the light detection section 30 and the resistor 30r is expressed by the following expression.

$$Vc = V30/(V30 + \text{resistance value of resistor } 30r)$$

V30: equivalent resistance value of light detection section

Accordingly, when a case where the environmental light Lc does not enter the light detection section 30 is compared with a case where the environmental light Lc enters the light detection section 30, the level and amplitude of the detection signal Vc become large in the case where the environmental light Lc enters the light detection section 30.

The position detecting section 50 generally includes a signal extraction circuit 190 for position detection, a signal separation circuit 170 for position detection, and an emission intensity compensation command circuit 180. The signal extraction circuit 190 for position detection includes a filter 192 consisting of a capacitor of about 1 nF, and the filter 192 functions as a high-pass filter which removes a direct-current component from a signal output from the connection point Q1 between the light detection section 30 and the resistor 30r. For this reason, only a position detection signal Vd by the light detection section 30 is extracted from the detection signal Vc output from the connection point Q1 between the light detection section 30 and the resistor 30r by the filter 192. That is, since it can be regarded that the detection light L2a and the reference light Lr are modulated, whereas the environmental light Lc has an intensity being constant within a certain period, a low-frequency component or direct-current component resulting from the environmental light Lc is removed by the filter 192.

Additionally, the signal extraction circuit 190 for position detection has an adder circuit 193 including a feedback resister 194 of about 220 kΩ in a subsequent stage of the filter 192, and the position detection signal Vd extracted by the filter 192 is output to the signal separation circuit 170 for position detection as a position detection signal Vs on which a voltage V/2 of ½ times the bias voltage Vb is overlapped.

The signal separation circuit 170 for position detection includes a switch 171 which performs a switching operation in synchronization with a driving pulse applied to the first light source section 12A for detection, a comparator 172, and a capacitor 173 which is electrically connected to an input line of the comparator 172. For this reason, when the position detection signal Vs is input to the signal separation circuit 170 for position detection, an effective value Vea of the position detection signal Vs when the first light source section 12A for detection is turned on and an effective value Veb of the position detection signal Vs when the light source 12R for reference is turned on are alternately output to the emission intensity compensation command circuit 180 from the signal separation circuit 170 for position detection.

The emission intensity compensation command circuit 180 compares the effective values Vea and Veb with each other, performs the processing shown in FIG. 6B, and outputs a control signal Vf to the light source driving circuit 140 so that the effective value Vea of the position detection signal Vs and the effective value Veb of the position detection signal Vs become the same level. That is, the emission intensity compensation command circuit 180 compares the effective value Vea of the position detection signal Vs with the effective value Veb of the position detection signal Vs, and maintains the present driving conditions in a case where the effective values are equal to each other. On the other hand, in a case where the effective value Vea of the position detection signal Vs is lower than the effective value Veb of the position detection signal Vs, the emission intensity compensation command circuit 180 reduces the resistance value of the variable resistance 111, and increases the quantity of the light emitted from the first light source section 12A for detection. Additionally, in a case where the effective value Veb of the position detection signal Vs is lower than the effective value Vea of the position detection signal Vs, the emission intensity compensation command circuit 180 reduces the resistance value of the variable resistance 112, and increases the quantity of the light emitted from the light source 12R for reference.

In this way, in the optical position detecting device 10, the controlled variables (driving currents) of the first light source section 12A for detection and the light source 12R for reference are controlled by the emission intensity compensation command circuit 180 of the position detecting section 50 so that the amounts of detection by the light detection section 30 during the turn-on operation of the first light source for detection and the turn-on operation of the light source for reference become equal to each other. Accordingly, information on the driving currents for the first light source section 12A for detection and the light source 12R for reference such that the amounts of detection by the light detection section 30 during the turn-on operation of the first light source for detection and the turn-on operation of the light source for reference become equal to each other exists in the emission intensity compensation command circuit 180, and this information is output to the position detecting section 50 as a position detection signal Vg.

The same processing is performed even between the second light source section 12B for detection, and the light source 12R for reference, and the signal Vg for position detection which is output from the emission intensity compensation command circuit 180 is information on the driving currents for the second light source section 12B for detection and the light source 12R for reference such that the amounts of detection by the light detection section 30 during the turn-on operation of the second light source section for detection and the turn-on operation of the light source for reference become equal to each other.

Detection of Z Coordinate

In the optical position detecting device 10 of the present embodiment, when the first light source section 12A for detection to the fourth light source section 12D for detection are simultaneously turned on, a light intensity distribution for Z coordinate detection in which intensity decreases monotonously in the normal direction to the viewing surface 41 is formed on the viewing surface 41 side (detection space 10R) of the viewing surface constituent member 40. In this light intensity distribution for Z coordinate detection, intensity decreases monotonously as it separates from the viewing surface 41 of the viewing surface constituent member 40. Accordingly, in the Z coordinate detector 53 of the position detecting section 50, the Z coordinate of the target object Ob can be detected on the basis of the difference or ratio of the detection values in the light detection section 30 when the light source 12R for reference, and the first light source section 12A for detection to the fourth light source section 12D for detection are alternately turned on. Additionally, in the Z coordinate detector 53 of the position detecting section 50, the Z coordinate of the target object Ob can be detected on the basis of the difference or ratio of the driving current for the light source 12R for reference and the driving currents for the first light source section 12A for detection to the fourth light source section 12D for detection when the detection values in the light detection section 30 when the light source 12R for reference and the first light source section 12A for detection to the fourth light source section 12D for detection are alternately turned on become equal to each other.

Main Effects of Present Embodiment

As described above, in the optical position detecting device 10 of the apparatus 1 with a position detection function of the present embodiment, the light source driving section 14 turns on the plurality of light source sections 12 for detection sequentially, and the light detection section 30 receives the detection light L3 reflected by the target object Ob during that time. Accordingly, if a detection result in the light detection section 30 is directly used, or a driving current when the two light source sections 12 for detection are differentially moved via the light detection section 30 is used, the position detecting section 50 can detect the position of the target object Ob. Here, as seen from the detection space 10R, the light detection section 30 is located inside the plurality of light source sections 12 for detection, the plurality of light source sections 12 for detection includes the outer light-emitting elements 12A₁ to 12D₁ and the inner light-emitting elements 12A₂ to 12D₂, respectively. Accordingly, the position detecting section 50 can determine whether the target object Ob is located either outside or inside the light source sections 12 for detection on the basis of comparison results between the light-receiving intensities in the light detection section 30 when the outer light-emitting elements 12A₁ to 12D₁ are turned on and the light-receiving intensities in the light detection section 30 when the inner light-emitting elements 12A₂ to 12D₂ are turned on. For this reason, when the ratio of the distance between one light source section 12 for detection of the two light source sections 12 for detection and the target object Ob and the distance between the other light source section 12 for detection and the target object Ob is obtained, decision whether the distance between the two light source sections 12 for detection is internally divided to specify the position of the target object Ob or the distance between the two light source sections 12 for detection is externally divided to specify the position of the target object Ob can be made correctly. Therefore, the position of the target object Ob can be accurately detected.

Additionally, in the present embodiment, since the differential movement in the two light source sections 12 for detection or the differential movement between the light source section 12 for detection and the light source 12R for reference is used, influence of environmental light or the like can be automatically corrected.

Moreover, since the detection light L2 is infrared light, the detection light is not viewed. Accordingly, the optical position detecting device 10 can be used for various apparatuses, for the reasons such as not hindering display even in a case where the optical position detecting device 10 of the present embodiment is applied to a display apparatus.

OTHER EMBODIMENTS

Although the outer light-emitting elements 12A₁ to 12D₁ are turned on when a differential movement is performed in the above embodiment, the inner light-emitting elements 12A₂ to 12D₂ may be turned on. Additionally, the outer light-emitting elements 12A₁ to 12D₁ and the inner light-emitting elements 12A₂ to 12D₂ may be turned on.

In the above embodiment, one and another of a plurality of light source sections 12 for position detection are alternately turned on when the light source sections 12 for position detection are differentially moved. However, two and other two of a plurality of light source sections 12 for position detection may be alternately turned on.

Additionally, in the above embodiment, one of a plurality of light source sections 12 for position detection and the light source 12R for reference are alternately turned on when the light source sections 12 for position detection, and the light source 12R for reference are differentially moved. However, after two of a plurality of light source sections 12 for position detection and the light source 12R for reference are alternately turned on, the other two light source sections and the light source 12R for reference are alternately turned on.

Although the above embodiment has been the example in which the number of the light source sections 12 for detection is four, the number of light source sections for detection may be two, or five or more. In a case where the number of light source sections for detection is two, the light detection section 30 is arranged inside a region pinched by a plurality of light source sections 12 for detection.

Concrete Example 1 of Apparatus 1 with Position Detection Function

An example in which the apparatus 1 with a position detection function is configured as a direct viewing type display apparatus with a position detection function, using a direct viewing type image generating device serving as a viewing surface constituent member 40 of the apparatus 1 with a position detection function will be described with reference to FIG. 7.

Figure 7:
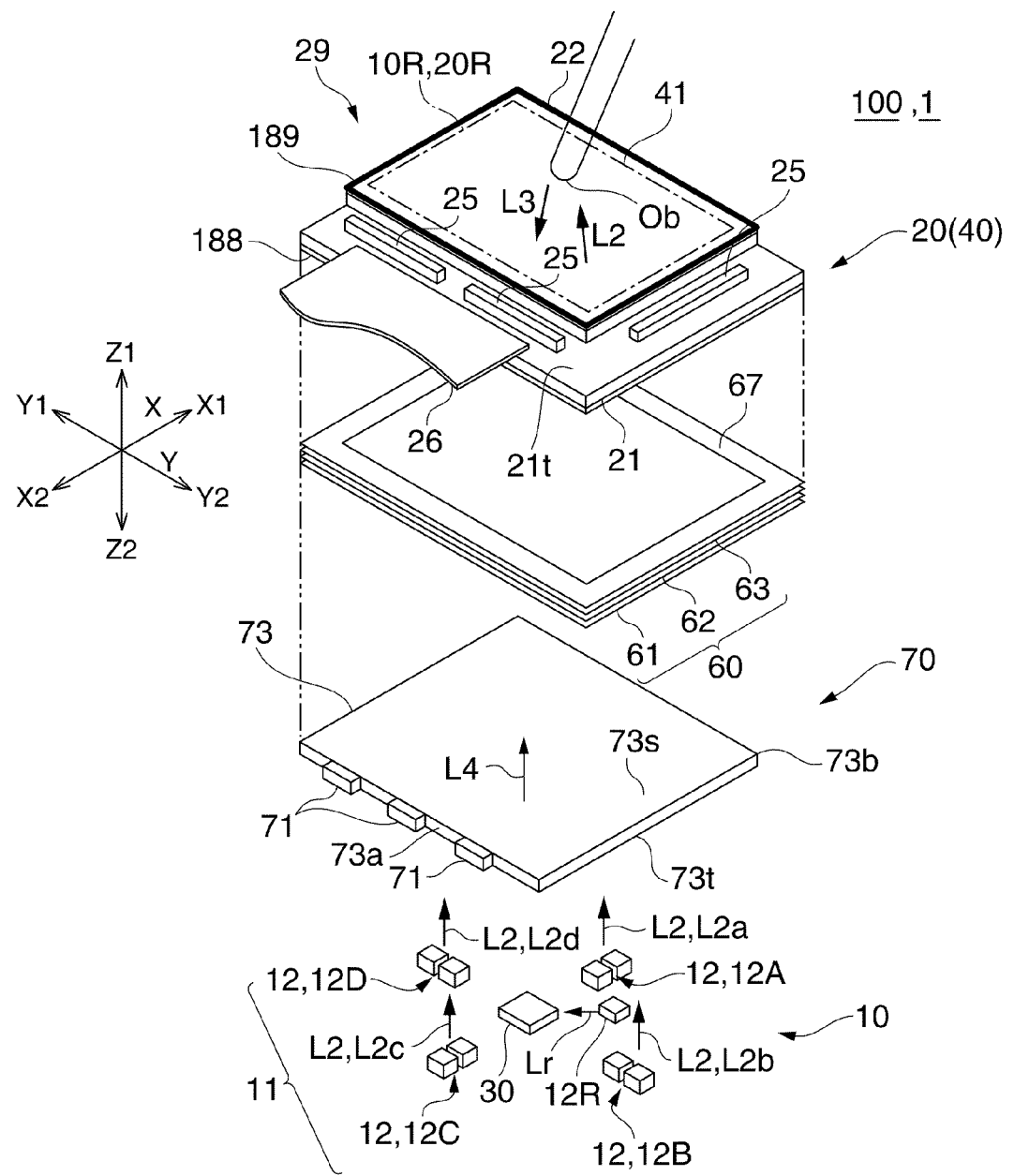
FIG. 7 is an exploded perspective view of a direct viewing type display apparatus (apparatus with a position detection function) with a position detection function to which the invention is applied.

FIG. 7 is an exploded perspective view of the direct viewing type display apparatus (apparatus 1 with a position detection function) with a position detection function to which the invention is applied. In addition, in the direct viewing type display apparatus with a position detection function of the present embodiment, the configuration of the optical position detecting device 10 is the same as the configuration described with reference to FIGS. 1A to 6B. Therefore, common portions are designated by the same reference numerals, and the description thereof is omitted.

The direct viewing type display apparatus 100 with a position detection function shown in FIG. 7 include the optical position detecting device 10 described with reference to FIGS. 1A to 6B, and a liquid crystal device 109 (a direct viewing type display apparatus/viewing surface constituent member 40) serving as an image generating device, and the viewing surface 41 from which information is viewed is constituted by one surface of the liquid crystal device 109. Even in the present embodiment, the optical position detecting device 10 has the light source unit 11 for position detection which emits the detection light L2 to the detection space 10R which detects the position of the target object Ob, and the light detection section 30 which detects the detection light L3 reflected by the target object Ob, and the light source unit 11 includes the plurality of light source sections 12 (first light source section 12A for detection to fourth light source section 12D for detection) for detection, and the light source 12R for reference. The liquid crystal device 109 includes an image display region 20R on the viewing surface 41, and the image display region 20R overlaps the detection space 10R, as seen from a Z-axis direction.

The liquid crystal device 109 includes a liquid crystal panel 109a on the emitting side of the detection light L2 with respect to the light source unit 11. The liquid crystal panel 109a is a transmissive liquid crystal panel, and has a structure in which two translucent substrates 21 and 22 are stuck together with a sealant, and a liquid crystal layer is filled in between the substrates. The liquid crystal panel 109a is an active matrix liquid crystal panel, translucent pixel electrodes, data lines, scanning lines, and pixel switching elements (not shown) are formed on any one of two translucent substrates 21 and 22, and a translucent common electrode (not shown) is formed on the other translucent substrate. In addition, pixel electrodes and the common electrode may be formed on the same substrate. In the liquid crystal panel 109a, when scanning signals are respectively output to the pixels via the scanning lines, and image signals are output via the data lines, the orientation of the liquid crystal layer in each of a plurality of pixels is controlled, and as a result, an image is formed in the image display region 20R. In the liquid crystal panel 109a, the one translucent substrate 21 is provided with a substrate overhanging portion 21t which overhangs to the periphery from the external shape of the other translucent substrate 22. Electronic components 25 which constitute a driving circuit or the like are mounted on the surface of the substrate overhanging portion 21t. Additionally, a wiring member 26, such as a flexible wiring substrate (FPC), is connected to substrate overhanging portion 21t. In addition, only the wiring member 26 may be mounted on the substrate overhanging portion 21t.

In the liquid crystal panel 109a, a first polarizing plate 188 is overlappingly arranged on the side (incident side of the detection light L2) where the light source unit 11 is located, and a second polarizing plate 189 is overlappingly arranged on the side (emitting side of the detection light L2) opposite to the side where the light source unit 11 is located.

In the liquid crystal device 109 configured in this way, in order to detect the position of the target object Ob, it is necessary to emit the detection light L2 to the detection space 10R where the target object Ob is located. Additionally, the liquid crystal panel 109a is arranged closer to the detection space 10R side than the liquid crystal device 16 for conversion of a light intensity distribution. For this reason, in the liquid crystal panel 109a, the image display region 20R is configured so as to allow the detection light L2 to be transmitted therethrough.

The liquid crystal device 109 includes an illumination unit 70 for illuminating the liquid crystal panel 109a. In the present embodiment, the illumination unit 70 is arranged closer to the emitting side of the detection light L2 than the light source unit 11. The illumination unit 70 includes a light source 71 for illumination, and a light guide plate 73 for illumination which propagates and emits the illumination light emitted from the light source 71 for illumination, and the light guide plate 73 for illumination includes a rectangular planar shape. The light source 71 for illumination consists of, for example, a light-emitting element, such as an LED (light emission diode), and emits, for example, white illumination light L4, corresponding to a driving signal output from a driving circuit (not shown). In the present embodiment, a plurality of light sources 71 for illumination is arrayed along a side portion 73a of the light guide plate 73 for illumination.

In the illumination unit 70, the illumination light emitted from the light source 71 for illumination enters the inside of the light guide plate 73 for illumination from the side portion 73a of the light guide plate 73 for illumination, and then propagates toward an outer edge portion 73b on the opposite side through the inside of the light guide plate 73 for illumination, and is emitted from a light-emitting portion 73s which is one surface. Here, the light guide plate 73 for illumination has a light guide structure in which the ratio of quantity of light of the emitting light from light-emitting portion 73s to internal propagation light increases monotonously from the side portion 73a side toward the outer edge portion 73b on the opposite side. This light guide structure is realized, for example, by gradually increasing the area of a refracting surface with a fine concavo-convex shape for light deflection or light scattering formed in the light-emitting portion 73s or a rear face 73t of the light guide plate 73 for illumination, the formation density of a printed scattering layer, or the like toward the above internal propagation direction. By providing such a light guide structure, the illumination light L4 which has been incident from the side portion 73a is almost uniformly emitted from the light emitting portion 73s.

In the liquid crystal device 16, an optical sheet 60 is arranged between the illumination unit 70 and the liquid crystal panel 109a. In the present embodiment, a first prism sheet 61, a second prism sheet 62, and a light-scattering plate 63 are laminated in order as the optical sheet 60. In addition, a rectangular frame-like light-shielding sheet 67 is arranged at the optical sheet 60, and the light-shielding sheet 67 prevents the detection light L2 from leaking.

In the direct viewing type display apparatus 100 with a position detection function configured in this way, the light source section 12 for detection emits the detection light L2 to the detection space 10R which is located on the viewing surface 41 side from the side opposite to the viewing surface 41 side in the liquid crystal device 109 (viewing surface constituent member 40), and the light detection section 30 detects the detection light L3 which is reflected by the target object Ob and transmitted through the liquid crystal device 109. Accordingly, in the direct viewing type display apparatus 100 with a position detection function, the position of the target object Ob can be detected. Thus, when an image displayed by the liquid crystal device 109 is indicated by the target object Ob, such as a fingertip, a predetermined information input can be performed.

Concrete Example 2 of Apparatus 1 with Position Detection Function

An example in which the apparatus 1 with a position detection function is configured as a screen apparatus with a position detection function, using a screen serving as a viewing surface constituent member 40 of the apparatus 1 with a position detection function will be described with reference to FIGS. 8A and 8B.

Figure 8A:
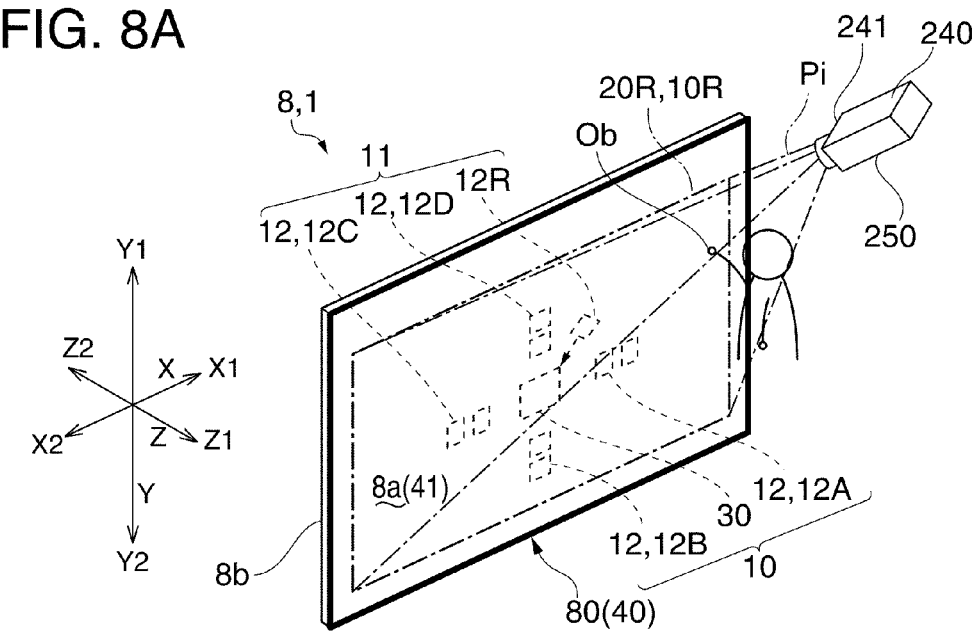
FIGS. 8A and 8B are explanatory views of a screen apparatus with a position detection function (apparatus with a position detection function) to which the invention is applied.
Figure 8B:
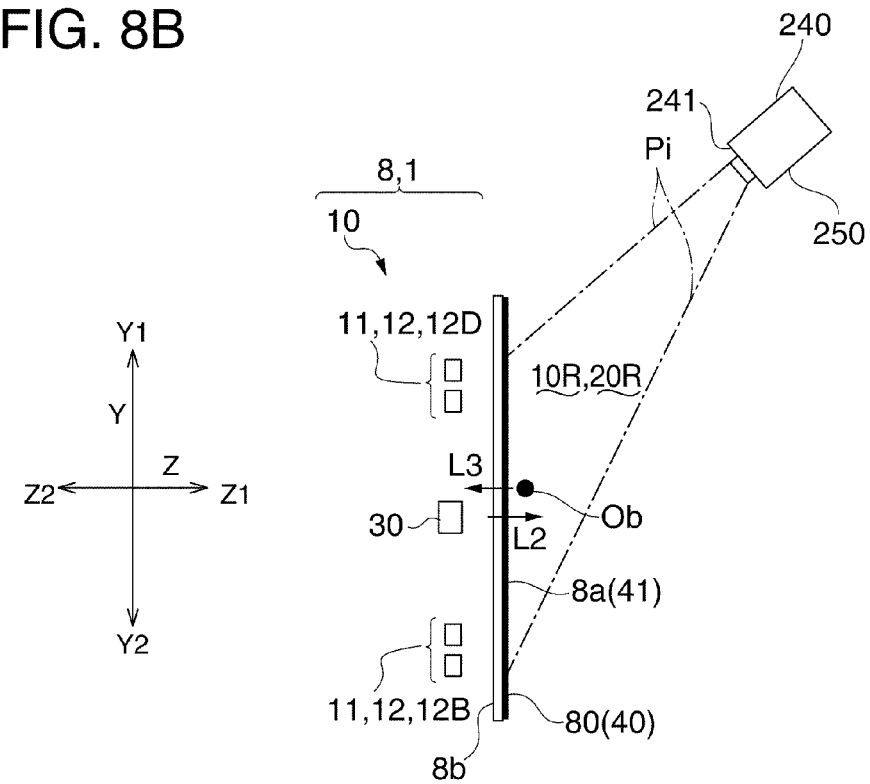

FIGS. 8A and 8B are explanatory views of the screen apparatus (apparatus 1 with a position detection function) with a position detection function to which the invention is applied, and FIGS. 8A and 8B are explanatory views typically showing that the screen apparatus with a position detection function is seen from obliquely above, and an explanatory view typically showing that the screen apparatus is seen from the lateral direction.

In addition, in the screen apparatus with a position detection function of the present embodiment, the configuration of the optical position detecting device 10 is the same as the configuration described with reference to FIGS. 1A to 6B. Therefore, common portions are designated by the same reference numerals, and the description thereof is omitted.

The screen apparatus 8 with a position detection function shown in FIGS. 8A and 8B includes a screen 80 (viewing surface constituent member 40) onto which an image is projected from an image projection device 250 (image generating device) called a liquid crystal projector or a digital micro mirror device, and the optical position detecting device 10 described with reference to FIGS. 1A to 6B, and the image projection device 250 extends and projects image display light Pi toward the screen apparatus 8 from a projector lens system 210 provided at a front face portion 241 of the housing 240. Accordingly, in the screen apparatus 8 with a position detection function, the viewing surface 41 from which information is viewed is constituted by the screen surface 8a onto which an image is projected in the screen 80.

In the screen apparatus 8 with a position detection function, the optical position detecting device 10 includes the light source unit 11 for position detection which emits the detection light L2 toward the rear surface 8b of the screen 80, the light detection section 30 which detects the detection light L3 reflected by the target object Ob, and the light source unit 11 includes the plurality of light source sections 12 (first light source section 12A for detection to fourth light source section 12D for detection) for detection and the light source 12R for reference. For this reason, the light source section 12 for detection emits the detection light L2 to the detection space 10R set on the viewing surface 41 side from the side opposite to the viewing surface 41 side in the screen 80 (viewing surface constituent member 40). Additionally, the light detection section 30 detects the detection light L3 which is reflected by the target object Ob and transmitted through the screen 80. Accordingly, a screen including translucency to the detection light L2 is used as the screen 80. More specifically, the screen 80 consists of cloth in which a white coating material is coated on the screen surface 8a side, or a white screen made of an embossed white vinyl material, and has translucency to the detection light L2 consisting of infrared light. As the screen 80, a silver screen which is highly silvered in order to increase the reflectivity of light, a pearl screen in which a cloth surface which constitutes the screen surface 8a side is resinated to increase the reflectivity of light, and a piece screen in which fine glass powder is applied on the screen surface 8a side to increase the reflectivity of light can be used. Even in such a case, the screen 80 includes translucency to the detection light L2 consisting of infrared light. In addition, for the purpose of increasing the quality of an image to be displayed, a black light-shielding layer may be formed on the rear surface 8b of the screen 80. In such a case, a plurality of translucent portions consisting of holes is formed in the light-shielding layer.

In the screen apparatus 8 with a position detection function configured in this way, the detection space 10R is a quadrangular region as seen from a direction normal to the screen apparatus 8, and overlaps the region (image display region 20R) onto which an image is projected by the image projection device 250 in the screen apparatus 8. For this reason, in the screen apparatus 8 with a position detection function of the present embodiment, for example, if the target object Ob, such as a fingertip, is made to approach a portion of an image projected onto the screen 80, the position of the target object Ob can be used as input information called switching instruction of an image or the like.

In addition, in the present embodiment, a screen apparatus for the projection type display apparatus in which an image is projected from the image projection device 250 has been described as the screen apparatus 8 with a position detection function. However, the optical position detecting device 10 may be provided in a screen for an electronic blackboard so as to constitute a screen apparatus with a position detection function for an electronic blackboard.

Figure 9A:
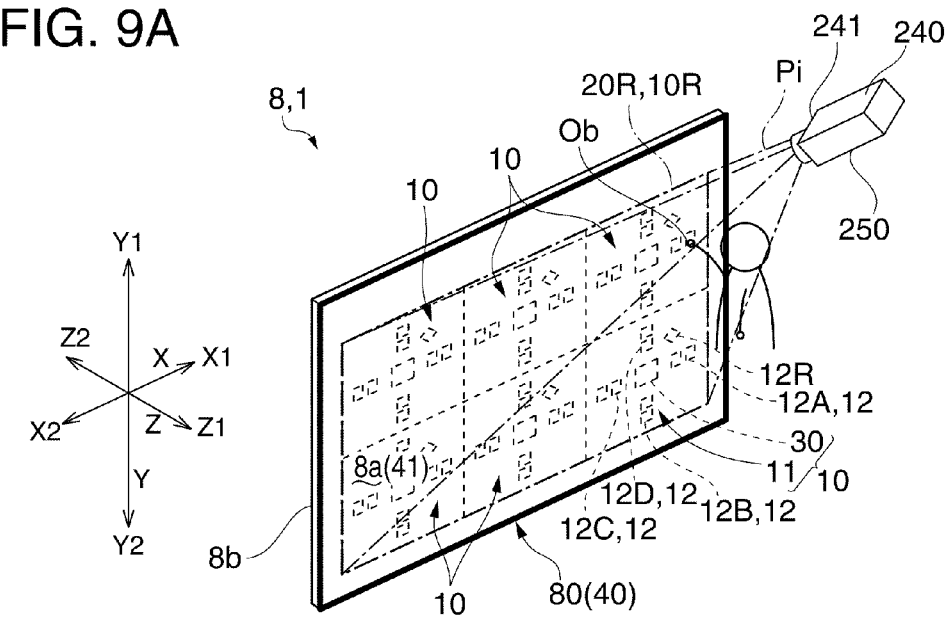
FIGS. 9A and 9B are explanatory views of another screen apparatus with a position detection function (apparatus with a position detection function) to which the invention is applied.
Figure 9B:
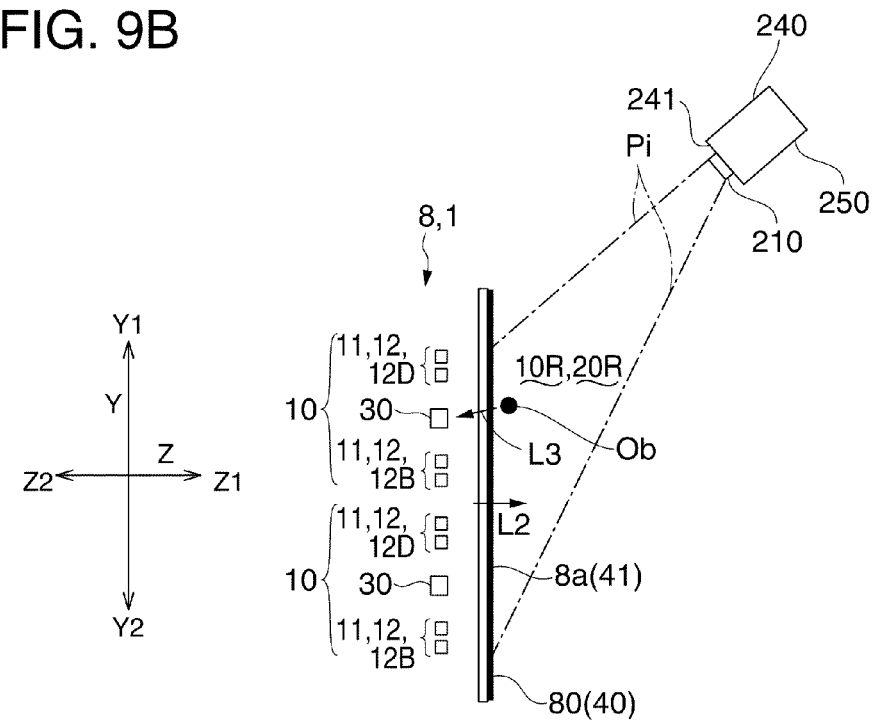

Modification of Concrete Example 2 of Apparatus 1 with Position Detection Function FIGS. 9A and 9B are explanatory views of another screen apparatus (apparatus 1 with a position detection function) with a position detection function to which the invention is applied, and FIGS. 9A and 9B are an explanatory view typically showing the screen apparatus with a position detection function as seen from obliquely above, and an explanatory view typically showing the screen apparatus as seen from the lateral direction. In addition, in the screen apparatus with a position detection function of the present embodiment, the configuration of the optical position detecting device 10 is the same as the configuration described with reference to FIGS. 1A to 6B. Therefore, common portions are designated by the same reference numerals, and the description thereof is omitted. Additionally, the screen apparatus with a position detection function of the present embodiment has the same configuration as the configuration described with reference to FIGS. 8A and 8B. Therefore, common portions are designated by the same reference numerals, and the description thereof is omitted.

In the screen apparatus 8 with a position detection function shown in FIGS. 8A and 8B, one optical position detecting device 10 is provided for one screen 80. However, in the screen apparatus 8 with a position detection function shown in FIGS. 9A and 9B, a plurality of optical position detecting devices 10 is provided for one screen 80. The plurality of optical position detecting devices 10 detects the position of the target object Ob in different regions of the screen 80, respectively. The other configurations are the same as the configurations described with reference to FIGS. 8A and 8B.

According to the present embodiment, since the plurality of optical position detecting devices 10 detects the position of the target object Ob while sharing the different regions of the screen 80, the position of the target object Ob can be detected with high precision over the overall wide screen 80. Additionally, since the plurality of optical position detecting devices 10 each includes the light source section 12 for detection and the light detection section 30, even when a plurality of target objects Ob exists on the screen 80, the positions of the plurality of target objects Ob can be detected.

Concrete Example 3 of Apparatus 1 with Position Detection Function

An example in which a projection type display apparatus with a position detection function is configured by a screen and an image projection device, using a screen serving as the viewing surface constituent member 40 of the apparatus 1 with a position detection function will be described with reference to FIGS. 10A and 10B.

Figure 10A:
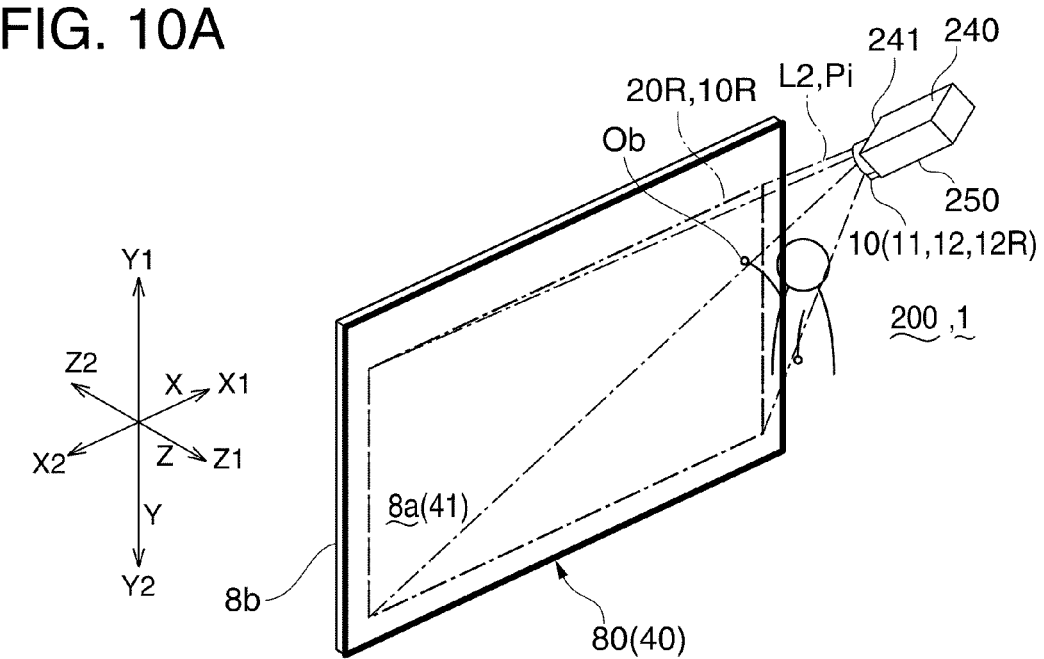
FIGS. 10A and 10B are explanatory views of a projection type display apparatus (apparatus with a position detection function) with a position detection function to which the invention is applied.
Figure 10B:
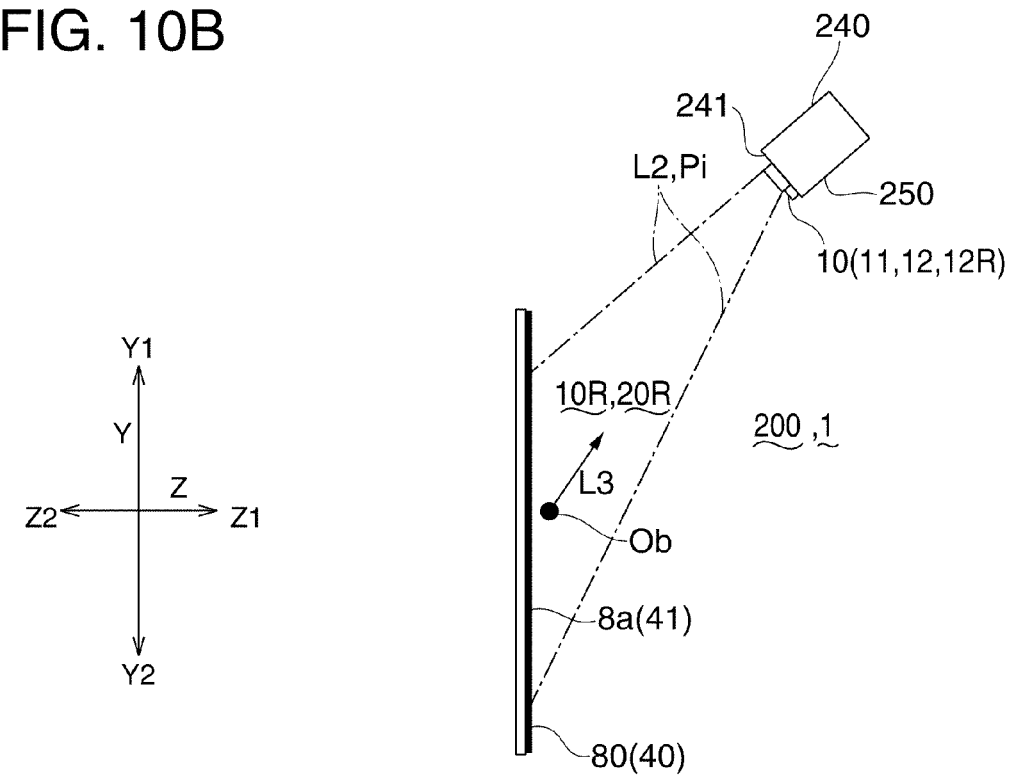

FIGS. 10A and 10B are explanatory views of the projection type display apparatus (apparatus 1 with a position detection function) with a position detection function to which the invention is applied, and FIGS. 10A and 10B are an explanatory view typically showing the projection type display apparatus with a position detection function as seen from obliquely above, and an explanatory view typically showing the projection type display apparatus as seen from the lateral direction. In addition, in the projection type display apparatus with a position detection function of the present embodiment, the configuration of the optical position detecting device 10 is the same as the configuration described with reference to FIGS. 1A to 6B. Therefore, common portions are designated by the same reference numerals, and the description thereof is omitted.

The projection type display apparatus 200 with a position detection function shown in FIGS. 10A and 10B includes the image projection device 250 (image generating device) called a liquid crystal projector or a digital micro mirror device, the screen 80 (viewing surface constituent member 40) onto which an image is projected from an image projection device 250, and the optical position detecting device 10 described with reference to FIGS. 1A to 6B. The image projection device 250 extends and projects image display light Pi toward the screen apparatus 8 from a projector lens system provided at a front face portion 241 of the housing 240. In the projection type display apparatus 200, the viewing surface 41 from which information is viewed is constituted by the screen surface 8a onto which an image is projected in the screen 80.

In the projection type display apparatus 200 with a position detection function, the optical position detecting device 10 (the light source unit 11 or light detection section 30) is loaded on the image projection device 250 arranged on the screen surface 8a (viewing surface 41) side of the screen 80. For this reason, the light source section 12 for detection emits the detection light L2 toward the viewing surface 41 of the screen 80 (viewing surface constituent member 40) from the image projection device 250. Additionally, the light detection section 30 detects the detection light L3 reflected by the target object Ob, in the image projection device 250.

In the projection type display apparatus 200 with a position detection function configured in this way, the detection space 10R is a quadrangular region as seen from a direction normal to the screen 80, and overlaps the region (image display region 20R) onto which an image is projected by the image projection device 250 in the screen 80. For this reason, in the projection type display apparatus 200 with a position detection function of the present embodiment, for example, if the target object Ob, such as a fingertip, is made to approach a portion of an image projected onto the screen 80, the position of the target object Ob can be used as input information called switching instruction of an image or the like.

Concrete Example 4 of Apparatus 1 with Position Detection Function

An example in which the apparatus 1 with a position detection function is configured as a window with a position detection function, using a translucent member covering exhibits serving as information as a viewing surface constituent member 40 of the apparatus 1 with a position detection function will be described with reference to FIGS. 11A and 11B.

Figure 11A:
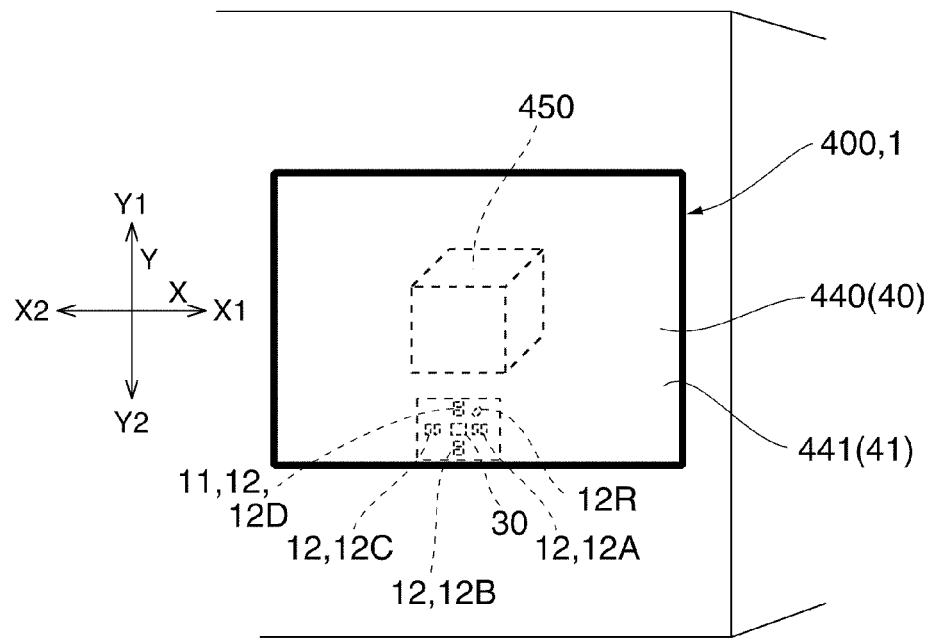
FIGS. 11A and 11B are explanatory views of a window with a position detection function (apparatus with a position detection function) to which the invention is applied.
Figure 11B:
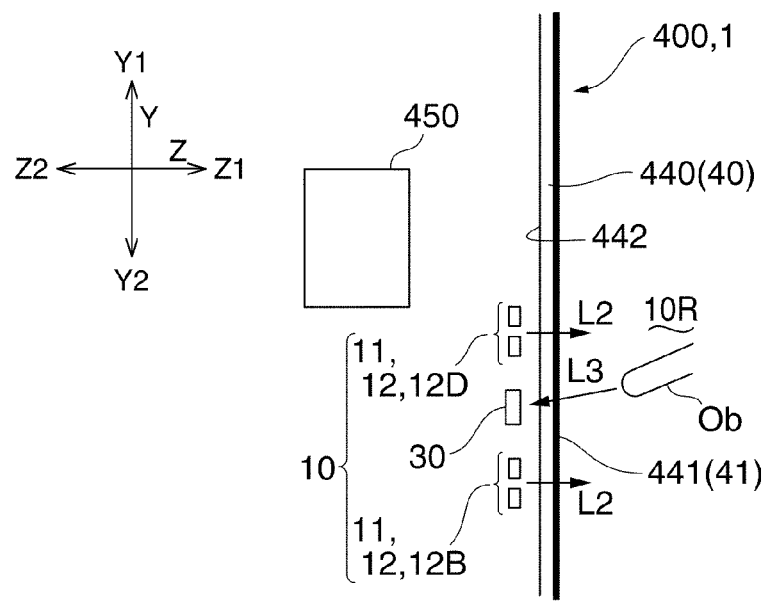

FIGS. 11A and 11B are explanatory views of the window (apparatus 1 with a position detection function) with a position detection function to which the invention is applied, and FIGS. 11A and 11B are an explanatory view typically showing the window with a position detection function as seen from the outside (viewing surface side), and an explanatory view typically showing the cross-section thereof. In addition, in the window with a position detection function of the present embodiment, the configuration of the optical position detecting device 10 is the same as the configuration described with reference to FIGS. 1A to 6B. Therefore, common portions are designated by the same reference numerals, and the description thereof is omitted.

The window 400 with a position detection function shown in FIGS. 11A and 11B includes a translucent member 440 (viewing surface constituent member 40) which covers an exhibit 450 as information, and the viewing surface (viewing surface 41) of the exhibit 450 is constituted by an external surface 441 of the translucent member 440. Additionally, in the window 400 with a position detection function, the exhibit 450 is held by an actuator (not shown) which makes the exhibit 450 perform operations, such as advancing or turning.

The window 400 with a position detection function includes the light source unit 11 and the light detection section 30 of the optical position detecting device 10 which has been described with reference to FIGS. 1A to 6B on the side of an internal surface 442 of the translucent member 440. The plurality of light source sections 12 (the first light source section 12A for detection to the fourth light source section 12D for detection) for detection of the light source unit 11 emits the detection light L2 toward an external surface 441 (viewing surface 41) from the inner side of the translucent member 440. Additionally, the light detection section 30 detects the detection light L3 which is reflected by the target object Ob and transmitted through the translucent member 440.

In the window 400 with a position detection function configured in this way, the detection space 10R of the optical position detecting device 10 is set on the external surface 441 side of the translucent member 440. Accordingly, if the target object Ob, such as a fingertip, is approached in the detection space 10R, the position of the target object Ob can be used as input information, such as the instruction of switching the orientation of an exhibit 450. For example, if the position of the target object Ob, such as a fingertip, is shifted downward, an exhibit 450 is made to approach the translucent member 440, and if the position of the target object Ob, such as a fingertip, is shifted to the right, the orientation of the exhibit 450, such as turning the exhibit 450 in the clockwise direction, can be changed.

Concrete Example 5 of Apparatus 1 with Position Detection Function

An example in which an amusement apparatus is configured as an amusement apparatus with a position detection function, using a base which supports a game medium in amusement apparatuses, such as a pachinko base, as the viewing surface constituent member 40 of the apparatus 1 with a position detection function will be described with reference to FIGS. 12A and 12B.

Figure 12A:
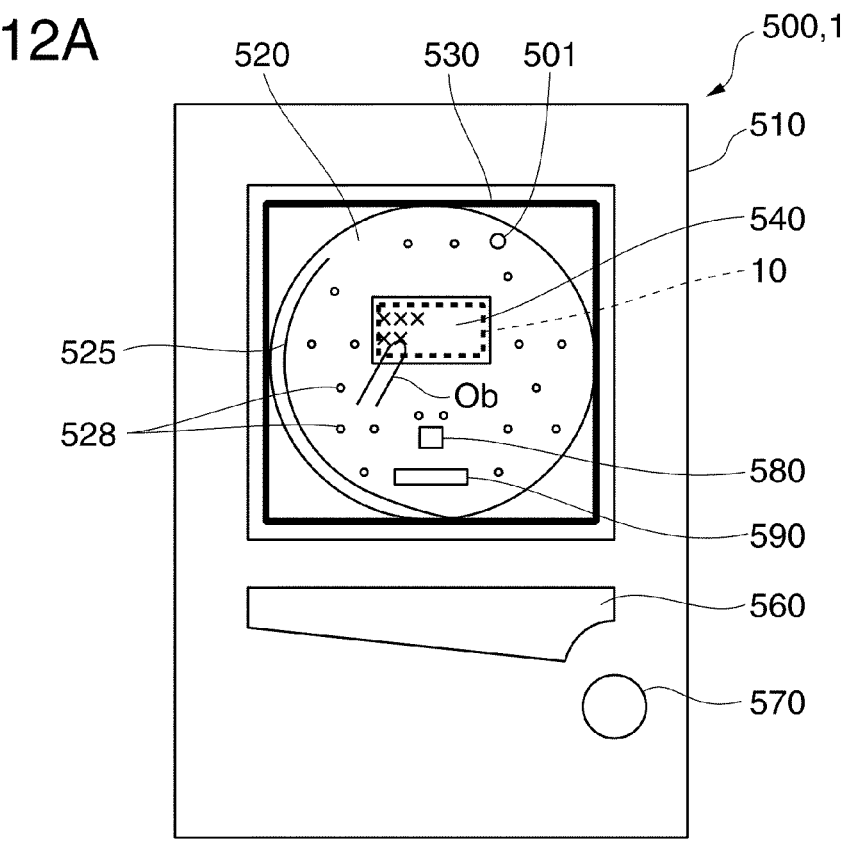
FIGS. 12A and 12B are explanatory views of an amusement apparatus with a position detection function (apparatus with a position detection function) to which the invention is applied.
Figure 12B:
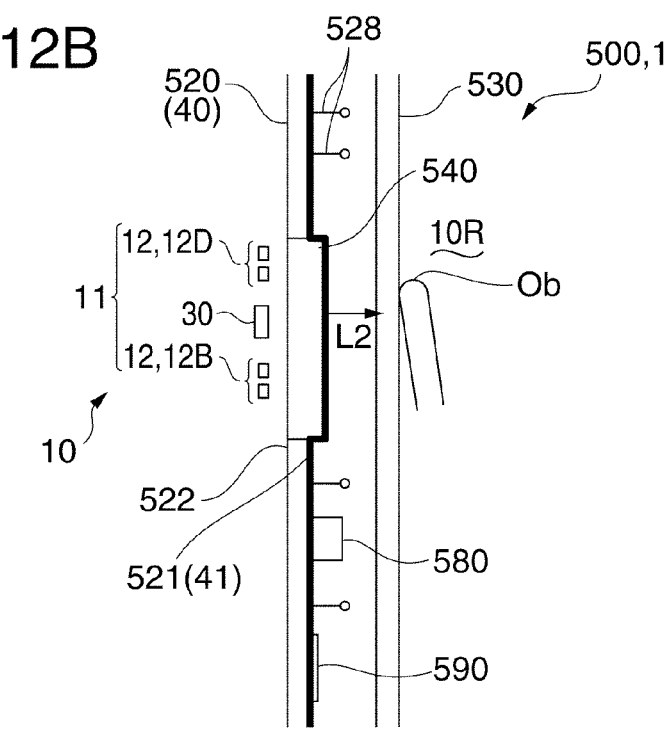

FIGS. 12A and 12B are explanatory views of the amusement apparatus (apparatus 1 with a position detection function) with a position detection function to which the invention is applied, and FIGS. 12A and 12B are explanatory views typically showing that the amusement apparatus with a position detection function is seen from the front (viewing surface side), and an explanatory view typically showing the cross-section thereof. In addition, in the amusement apparatus with a position detection function of the present embodiment, the configuration of the optical position detecting device 10 is the same as the configuration described with reference to FIGS. 1A to 6B. Therefore, common portions are designated by the same reference numerals, and the description thereof is omitted.

The amusement apparatus 500 with a position detection function shown in FIGS. 12A and 12B includes a plate-shaped base 520 (viewing surface constituent member 40) which supports a game media 501, such as a pachinko ball, an outer frame 510 which holds the base 520, a handle 570 which sets a position or the like where the game medium 501 is sent out onto the base 520, a receiving tray 560 which receives the game medium 501, and the like. A surface 521 (viewing surface 41) of the base 520 is covered with a glass plate 530. In the surface 521 of the base 520, a guide rail 525 for the game medium 501, a nail 528 which changes the movement of the game medium 501, winning pockets 580 and 590, and the like are provided inside the glass plate 530. Additionally, in the surface 521 of the base 520, a liquid crystal device 540 on which a result of the drawing performed whenever the game medium 501 goes into the winning pocket 580 is displayed is provided inside the glass plate 530.

In the amusement apparatus 500 with a position detection function, a rear surface 522 of the base 520 is provided with the light source unit 11 and the light detection section 30 of the optical position detecting device 10 described with reference to FIGS. 1A to 6B. The plurality of light source sections 12 for detection of the light source unit 11 emit the detection light L2 to the detection space 10R set on the side of the surface 452 (viewing surface 41) from the rear surface 522 side of the base 520. Additionally, the light detection section 30 detects the detection light L3 which is reflected by the target object Ob and transmitted through the translucent member 440.

In arranging the optical position detecting device 10 in this way, in the present embodiment, the liquid crystal device 540 is configured as the direct viewing type display apparatus 100 with a position detection function described with reference to FIG. 7. That is, the light source unit 11 and the light detection section 30 are provided on the side of the rear surface of the liquid crystal device 540. For this reason, in the amusement apparatus 500 with a position detection function of the present embodiment, the detection space 10R is set in the region where the detection space overlaps the liquid crystal device 540 on the side of the surface 452 (viewing surface 41 side) of the base 520. Additionally, in the present embodiment, the external surface side of the glass plate 530 is used as the detection space 10R, and the position of the target object Ob located in this detection space 10R is detected.

For this reason, if a gamer makes the target object Ob, such as a fingertip, approach the detection space 10R in accordance with the contents or progress of a game which is displayed by the liquid crystal device 540, the position of the target object Ob can be used as input information such as an instruction of switching the contents displayed by the liquid crystal device 540.

Figure 13A:
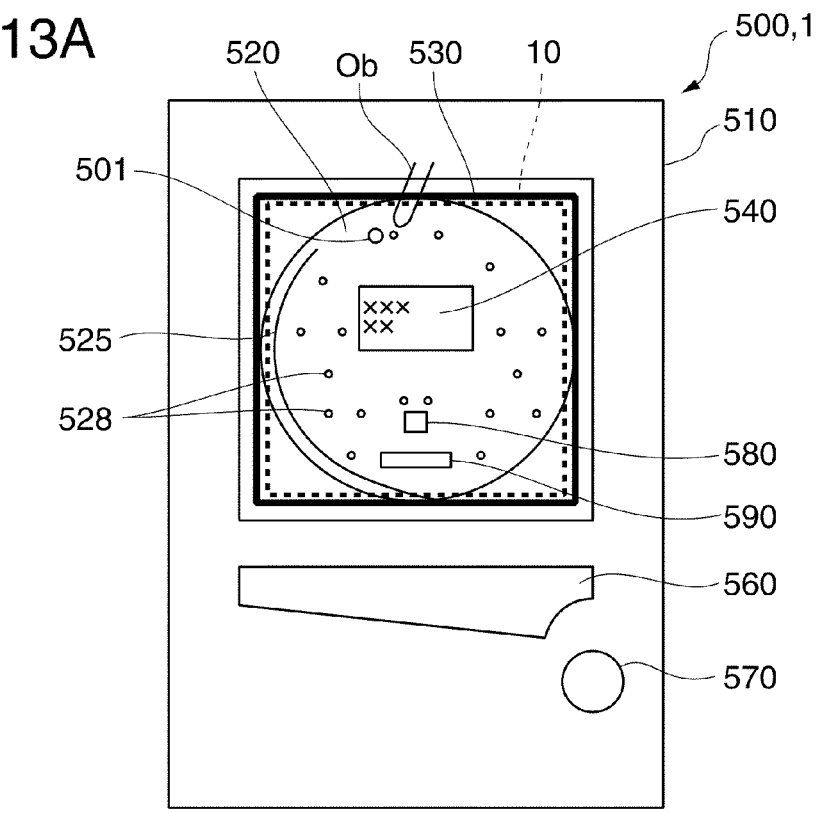
FIGS. 13A and 13B are explanatory views of another amusement apparatus with a position detection function (apparatus with a position detection function) to which the invention is applied.
Figure 13B:
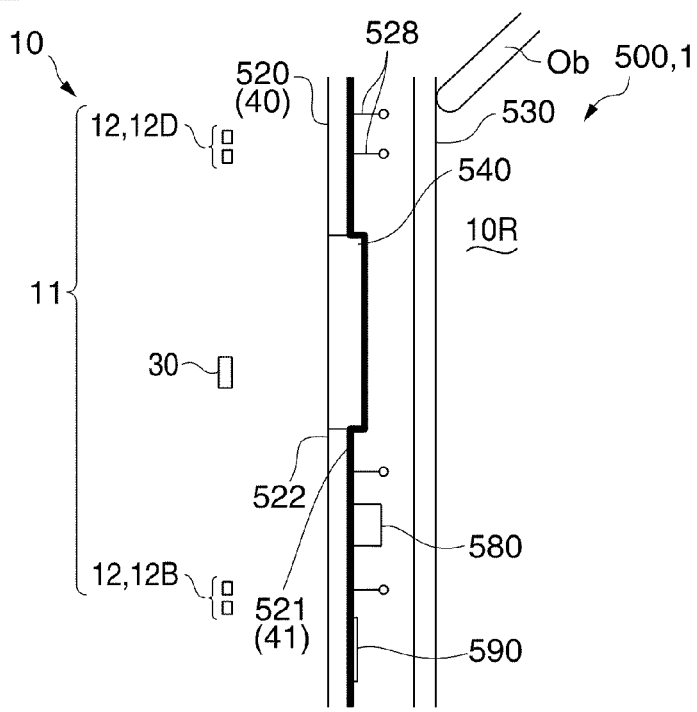

Modification 1 of Concrete Example 5 of Apparatus 1 with Position Detection Function FIGS. 13A and 13B are explanatory views of another amusement apparatus (apparatus 1 with a position detection function) with a position detection function to which the invention is applied, and FIGS. 13A and 13B are an explanatory view typically showing the amusement apparatus with a position detection function as seen from the front (viewing surface side), and an explanatory view typically showing the cross-section thereof. In addition, in the amusement apparatus with a position detection function of the present embodiment, the configuration of the optical position detecting device 10 is the same as the configuration described with reference to FIGS. 1A to 6B. Therefore, common portions are designated by the same reference numerals, and the description thereof is omitted. Additionally, the amusement apparatus with a position detection function of the present embodiment has the same configuration as the configuration described with reference to FIGS. 12A and 12B. Therefore, common portions are designated by the same reference numerals, and the description thereof is omitted.

Even in the amusement apparatus 500 with a position detection function shown in FIGS. 13A and 13B, similarly to the configuration described with reference to FIGS. 12A and 12B, the rear surface 522 of the base 520 (viewing surface constituent member 40) which supports the game medium 501 consisting of a pachinko ball is provided with the light source unit 11 and the light detection section 30 of the optical position detecting device 10 described with reference to FIGS. 1A to 6B. The plurality of light source sections 12 for detection of the light source unit 11 emits the detection light L2 toward the surface 452 (viewing surface 41) from the rear surface 522 side of the base 520. Additionally, the light detection section 30 detects the detection light L3 which is reflected by the target object Ob and transmitted through the translucent member 440.

In the present embodiment, the detection light L2 consisting of infrared light can be transmitted through the overall base 520 including the liquid crystal device 540. Accordingly, in the present embodiment, the light source unit 11 and the light detection section 30 are provided using the overall rear surface 522 of the base 520. For this reason, in the amusement apparatus 500 with a position detection function of the present embodiment, the detection space 10R is set throughout the region where the detection space 10R overlaps the base 520 on the side of the surface 452 (viewing surface 41 side) of the base 520. Additionally, in the present embodiment, the detection space 10R is set on the external surface side of the glass plate 530.

For this reason, if a gamer makes the target object Ob, such as a fingertip, approach the detection space 10R in accordance with the contents or progress of a game which is displayed by the liquid crystal device 540, the position of the target object Ob can be used as input information such as an instruction of switching the contents displayed by the liquid crystal device 540. Additionally, if the target object Ob, such as a fingertip, is made to approach any of an upper side of the base 520 instead of the operation of the handle 570, such an instruction place can be used as input information such as an instruction of specifying the intensity when the game medium 501 is sent out onto the base 520.

Figure 14A:
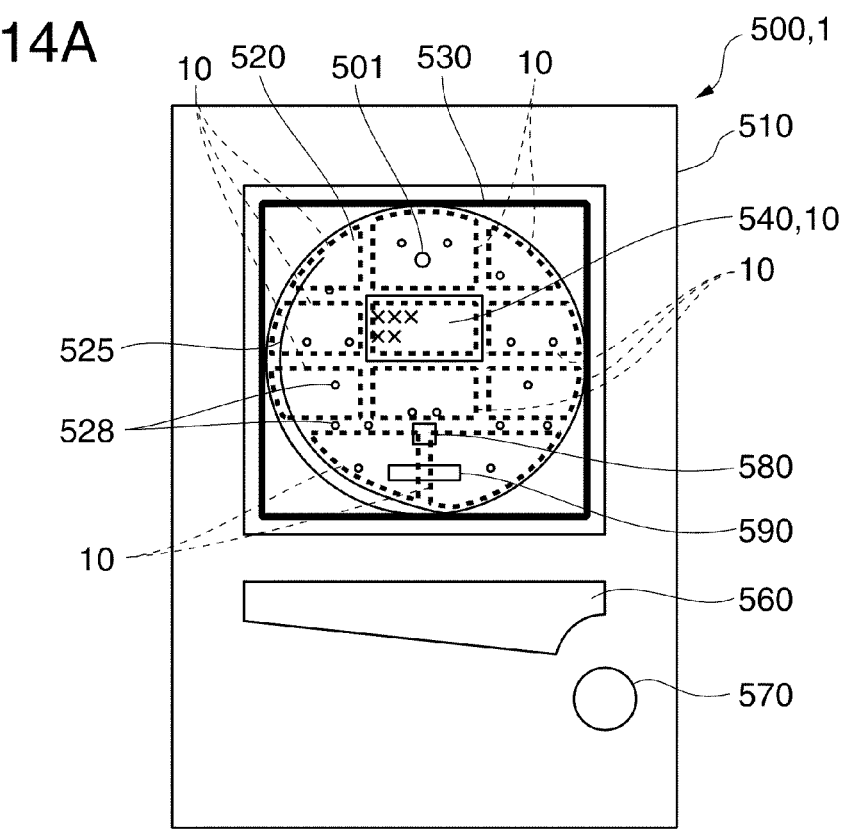
FIGS. 14A and 14B are explanatory views of still another amusement apparatus with a position detection function (apparatus with a position detection function) to which the invention is applied.
Figure 14B:
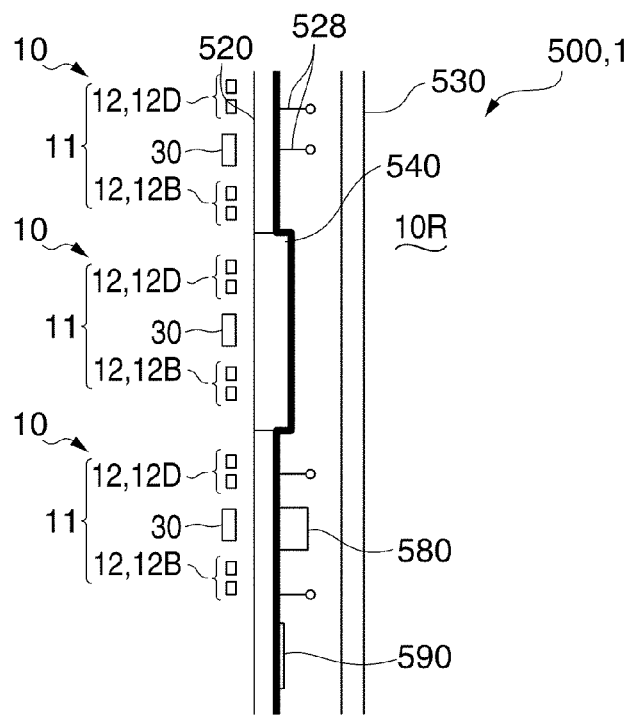

Modification 2 of Concrete Example 5 of Apparatus 1 with Position Detection Function FIGS. 14A and 14B are explanatory views of still another amusement apparatus (apparatus 1 with a position detection function) with a position detection function to which the invention is applied, and FIGS. 14A and 14B are an explanatory view typically showing the amusement apparatus with a position detection function as seen from the front (viewing surface side), and an explanatory view typically showing the cross-section thereof. In addition, in the amusement apparatus with a position detection function of the present embodiment, the configuration of the optical position detecting device 10 is the same as the configuration described with reference to FIGS. 1A to 6B. Therefore, common portions are designated by the same reference numerals, and the description thereof is omitted. Additionally, the amusement apparatus with a position detection function of the present embodiment has the same configuration as the configuration described with reference to FIGS. 12A and 12B. Therefore, common portions are designated by the same reference numerals, and the description thereof is omitted.

Even in the amusement apparatus 500 with a position detection function shown in FIGS. 14A and 14B, similarly to the configuration described with reference to FIGS. 12A and 12B, the rear surface 522 of the base 520 (viewing surface constituent member 40) which supports the game medium 501 consisting of a pachinko ball is provided with the light source unit 11 and the light detection section 30 of the optical position detecting device 10 described with reference to FIGS. 1A to 6B. The plurality of light source sections 12 for detection of the light source unit 11 emits the detection light L2 toward the surface 452 (viewing surface 41) from the rear surface 522 side of the base 520. Additionally, the light detection section 30 detects the detection light L3 which is reflected by the target object Ob and transmitted through the translucent member 440.

Here, in the amusement apparatus 500 with a position detection function described with reference to FIGS. 12A and 12B and 13A and 13B, one optical position detecting device 10 is provided for one base 520. However, in the amusement apparatus 500 with a position detection function of the present embodiment shown in FIGS. 14A and 14B, a plurality of optical position detecting devices 10 is provided for one base 520. The plurality of optical position detecting devices 10 detects the position of the target object Ob in different regions of the base 520, respectively. The other configurations are the same as the configurations described with reference to FIGS. 12A and 12B or the like.

According to the present embodiment, since the plurality of optical position detecting devices 10 detects the position of the target object Ob while sharing the different regions of the base 520, the position of the target object Ob can be detected with high precision over the overall wide base 520. Additionally, since the plurality of optical position detecting devices 10 each includes the light source section 12 for detection and the light detection section 30, even when a plurality of target objects Ob exists on the base 520, the positions of the plurality of target objects Ob can be detected. Therefore, the number of the game medium 501, which passes through every region of the base 520, can also be detected. In addition, the places where the light sources for detection and the light detection section are arranged as translucent portions of the base 520.

The entire disclosure of Japanese Patent Application No. 2010-103106, filed Apr. 28, 2010 is expressly incorporated by reference herein.

What is claimed is:

1. An apparatus with a position detection function which detects a position of a target object, the apparatus comprising:
    a translucent portion;
    a plurality of detection light sources that emit detection light toward the translucent portion, the plurality of detection light sources having a plurality of first light-emitting elements and a plurality of second light-emitting elements;
    a light detector that receives reflected light that is created by the target object when the target object reflects the detection light;
    a light source driver that selectively turns on the plurality of first and second light-emitting elements; and
    a position detector that detects the position of the target object based on the received reflected light by the light detector, wherein
    in a plan view, the plurality of first light-emitting elements are located on a first circumference with a first diameter so as to around the light detector, the plurality of second light-emitting elements are located on a second circumference with a second diameter that is shorter than the first diameter so as to around the light detector, and the first and second circumference have a same center,
    the plurality of first light-emitting elements and the plurality of second light-emitting elements alternately emit the detection light with same intensity,
    the position detector detects that the target object is located closer to the first circumference than the second circumference when first intensity of the reflected light emitted by the plurality of first light-emitting elements is larger than second intensity of the reflected light emitted by the plurality of second light-emitting elements, and
    the position detector detects that the target object is located closer to the second circumference than the first circumference when the first intensity of the reflected light emitted by the plurality of first light-emitting elements is smaller than the second intensity of the reflected light emitted by the plurality of second light-emitting elements.

2. The apparatus with a position detection function according to claim 1, wherein
    an emitting direction of the detection light from the plurality of detection light sources is a Z-axis direction, and an X-axis direction and a Y-axis direction intersect the Z-axis direction, and
    the plurality of first and second light-emitting elements are located along the X-axis direction and the Y-axis direction.

3. The apparatus with a position detection function according to claim 1, wherein
    the position detector detects following four positions of the target object based on the first and second light intensity:
        (i) inside the second circumference;
        (ii) outside the second circumference, inside the first circumference, and closer to the second circumference than the first circumference;
        (iii) outside the second circumference, inside the first circumference, and closer to the first circumference than the second circumference; and
        (iv) outside the first circumference.

4. The apparatus with a position detection function according to claim 1, wherein
    the position detector detects the position of the target object based on the received reflected light when the light source driver differentially operates the plurality of first and second light-emitting elements.

5. The apparatus with a position detection function according to claim 1, further comprises:
    a reference light source that emits reference light toward the light detector, wherein
    the position detector detects the position of the target object based on the received reflected light when the light source driver differentially operates the plurality of first and second light-emitting elements and the reference light source by changing turn-on-time-combinations among the plurality of first and second light-emitting elements and the reference light source.

6. The apparatus with a position detection function according to claim 1, wherein
    the detection light is infrared light.

7. The apparatus with a position detection function according to claim 1,
    wherein the translucent portion is a translucent member that covers the plurality of detection light sources, the light detector, the light source driver, and the position detector.

* * * * *